(12) United States Patent
Lee

(10) Patent No.: US 12,434,227 B2
(45) Date of Patent: Oct. 7, 2025

(54) CATALYTIC REACTION APPARATUS COMPRISING COATING COMPOSITION FOR CATALYST AND COATING METHOD

(71) Applicant: KUK IL INNTOT CO., LTD., Ulsan (KR)

(72) Inventor: Jong Chul Lee, Ulsan (KR)

(73) Assignee: KUK IL INNTOT CO., LTD., Ulsan (KR)

( * ) Notice: Subject to any disclaimer, the term of this patent is extended or adjusted under 35 U.S.C. 154(b) by 771 days.

(21) Appl. No.: 17/627,930

(22) PCT Filed: Jul. 16, 2020

(86) PCT No.: PCT/KR2020/009379
§ 371 (c)(1),
(2) Date: Mar. 28, 2022

(87) PCT Pub. No.: WO2021/010768
PCT Pub. Date: Jan. 21, 2021

(65) Prior Publication Data
US 2022/0258135 A1 Aug. 18, 2022

(30) Foreign Application Priority Data

Jul. 16, 2019 (KR) .................. 10-2019-0085796
Oct. 29, 2019 (KR) .................. 10-2019-0134993
(Continued)

(51) Int. Cl.
*B01J 23/30* (2006.01)
*B01D 53/86* (2006.01)
*B01J 37/02* (2006.01)

(52) U.S. Cl.
CPC .......... *B01J 23/30* (2013.01); *B01D 53/8628* (2013.01); *B01J 37/0215* (2013.01);
(Continued)

(58) Field of Classification Search
CPC ... B01J 23/30; B01J 37/0215; B01D 53/8628; B01D 2255/20707; B01D 2255/20723; B01D 2255/20776
(Continued)

(56) References Cited

U.S. PATENT DOCUMENTS 4,916,107 A 4/1990 Brand et al.
5,346,675 A 9/1994 Usui et al.
(Continued)

FOREIGN PATENT DOCUMENTS

CN 102794168 A 11/2012
JP 63-150015 U 10/1988
(Continued)

*Primary Examiner* — Patricia L. Hailey
(74) *Attorney, Agent, or Firm* — NKL Law; Jae Youn Kim

(57) ABSTRACT

A catalytic reaction apparatus includes a coating composition for a catalyst and a catalyst portion to which the coating composition is applied, wherein the coating composition includes 1 to 15 parts by weight of tungsten, 1 to 15 parts by weight of vanadium, 35 to 55 parts by weight of titanium and 30 to 45 parts by weight of oxygen. This apparatus is configured to prevent a decrease in catalytic reaction efficiency in a specific temperature environment, thereby maximizing versatility.

4 Claims, 44 Drawing Sheets

(30) Foreign Application Priority Data

Mar. 17, 2020 (KR) .................. 10-2020-0032768
May 6, 2020 (KR) .................. 10-2020-0053880

(52) U.S. Cl.
 CPC .............. *B01D 2255/20707* (2013.01); *B01D 2255/20723* (2013.01); *B01D 2255/20776* (2013.01)

(58) Field of Classification Search
 USPC ....... 502/182, 248, 263, 309, 311, 312, 322, 502/527.22; 106/286.3–286.5; 428/116, 428/117; 422/180, 181
 See application file for complete search history.

(56) References Cited

U.S. PATENT DOCUMENTS

| | | | | |
|---|---|---|---|---|
| 5,753,582 A | * | 5/1998 | Garcin | ............... B01J 23/22 502/305 |
| 6,602,818 B2 | * | 8/2003 | Choi | ............... B01J 37/04 502/514 |
| 6,710,013 B1 | * | 3/2004 | Kato | ............... F01N 3/2814 502/527.22 |
| 8,673,250 B2 | | 3/2014 | Kai et al. | |
| 2008/0152560 A1 | * | 6/2008 | Morita | ............... C01G 23/003 423/598 |
| 2010/0036138 A1 | * | 2/2010 | Okamoto | ............... B01J 21/18 502/178 |
| 2012/0277466 A1 | * | 11/2012 | Nagaki | ............... B01J 35/651 502/355 |
| 2014/0113802 A1 | * | 4/2014 | Yu | ............... B01J 37/0201 502/182 |
| 2015/0273436 A1 | * | 10/2015 | Ono | ............... C04B 38/0096 428/116 |

FOREIGN PATENT DOCUMENTS

| | | |
|---|---|---|
| JP | 01108321 U | 7/1989 |
| JP | 01168341 A | 7/1989 |
| JP | 02-083322 U | 6/1990 |
| JP | 02-245224 A | 10/1990 |
| JP | 02-293043 A | 12/1990 |
| JP | 0457243 U | 5/1992 |
| JP | 06-064721 U | 9/1994 |
| JP | 07-171418 A | 7/1995 |
| JP | 08-029088 A | 2/1996 |
| JP | 08-112534 A | 5/1996 |
| JP | 2002221023 A | 8/2002 |
| JP | 2003126703 A | 5/2003 |
| JP | 2004181293 A | 7/2004 |
| JP | 2004237367 A | 8/2004 |
| JP | 2004290754 A | 10/2004 |
| JP | 2009-528165 A | 8/2009 |
| KR | 10-2000-0068521 A | 11/2000 |
| KR | 10-1095229 B1 | 12/2011 |
| KR | 10-2012-0095375 A | 8/2012 |
| KR | 10-2014-0132940 A | 11/2014 |
| KR | 10-2017-0042573 A | 4/2017 |
| WO | 2015187525 A1 | 12/2015 |
| WO | 2019096785 A1 | 5/2019 |

* cited by examiner

CATALYTIC REACTION APPARATUS COMPRISING COATING COMPOSITION FOR CATALYST AND COATING METHOD

TECHNICAL FIELD

The present invention relates to a catalytic reaction apparatus including a coating composition for a catalyst and a coating method thereof. In more detail, it relates to a catalytic reaction apparatus coated with a coating composition having high catalytic reaction efficiency in low-temperature and high-temperature environments, and a coating method of the coating composition.

BACKGROUND ART

In general, catalysts for filters are used for the purpose of removing dust, bacteria, and other pollutants in indoor air or for minimizing the generation of nitrogen oxides generated at industrial sites. The catalyst as described above activates water and oxygen contained in the air to decompose and remove adsorbed pollutants, thereby purifying the air and preventing environmental pollution. In particular, in the case of a vanadium/titanium catalyst, nitrogen oxide selectively reacts with ammonia as a reducing agent and decomposes into nitrogen and water, so it is widely used. However, the catalyst as described above is difficult to activate in a low-temperature environment, and thus has a problem in that catalytic conversion efficiency is lowered.

RELATED ART LITERATURE

Patent Literature

Prior Literature 1: Republic of Korea Patent Registration No. 10-1095229 (Registered on Dec. 9, 2011).

DISCLOSURE

Technical Problem

The technical problem of the present invention is to induce a catalytic reaction with higher efficiency.

In addition, an object of the present invention is to induce easy activation in a high temperature environment as well as a low temperature environment to carry out an easy catalytic reaction.

Technical Solution

To this end, the present invention provides a catalytic reaction apparatus including a coating composition for a catalyst and a coating method of the coating composition, the apparatus including a catalyst portion to which a coating composition is applied, wherein the coating composition includes 1 to 15 parts by weight of tungsten, 1 to 15 parts by weight of vanadium, 35 to 55 parts by weight of titanium and 30 to 45 parts by weight of oxygen.

Advantageous Effects

According to the present invention, it is possible to prevent a decrease in catalytic reaction efficiency in a specific temperature environment, thereby maximizing versatility.

MODES OF THE INVENTION

Figure 1:
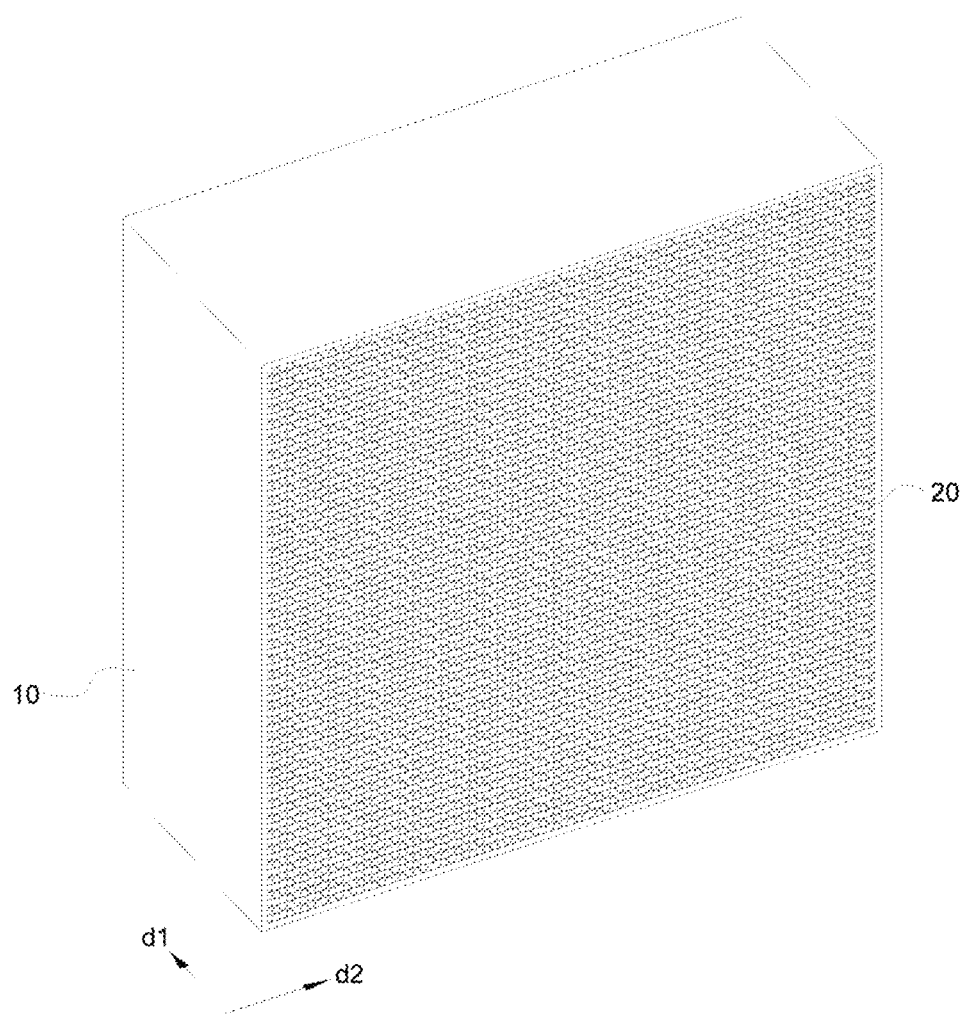
FIG. 1 is a view showing the entire catalytic reaction apparatus according to a first embodiment of the present invention.

A catalytic reaction apparatus includes a catalyst portion to which a coating composition is applied, wherein the coating composition includes 1 to 15 parts by weight of tungsten, 1 to 15 parts by weight of vanadium, 35 to 55 parts by weight of titanium and 30 to 45 parts by weight of oxygen.

MODES FOR CARRYING OUT THE INVENTION

Hereinafter, embodiments of the present invention will be described in detail with reference to the accompanying drawings so as to be easily carried out by those skilled in the art. However, the present invention may be embodied in many different forms and is not limited to the embodiments set forth herein. In addition, in order to clearly disclose the present invention in the drawings, parts irrelevant to the present invention are omitted, and the same or similar symbols in the drawings indicate the same or similar components.

Objects and effects of the present invention can be naturally understood or more clearly understood by the following description, and the objects and effects of the present invention are not limited to only the following description.

The objects, features and advantages of the present invention will become more apparent from the following detailed description. In the description of the present invention, when it is determined that a specific description of a known function or configuration may unnecessarily obscure the gist of the present invention, the detailed description thereof will be omitted.

Before describing the present invention in detail, "upward direction" means an upward direction in the drawings and "downward direction" means a downward direction in the drawings. The lateral direction means a left direction or a right direction in the drawings. The "first direction d1" refers to a direction toward the inside of the body portion 10 in the direction of the open surface of the main body portion 10, and a direction from the front to the rear. In addition, the "second direction d2" is orthogonal to the "first direction d1", refers to a direction from one side of the body portion 10 to the other side, and refers to the right upper direction in FIG. 1. In addition, the "fluid" means an agent which is introduced into the catalytic reaction apparatus according to the present invention and is catalytically reacted by the first catalytic portion 21 and the second catalytic portion 22 described later to remove and reduce impurities such as nitrogen oxides and contaminants. Additionally, "outer direction" refers to a direction facing outward with respect to the body portion 10, and "inward direction" refers to a direction opposite to the "outer direction" as a direction from the outside of the body portion 10 to the inside.

Hereinafter, embodiments of the present invention will be described in detail with reference to the accompanying drawings.

First Embodiment

FIG. 1 is a view showing the entire catalytic reaction apparatus according to a first embodiment of the present invention.

The catalytic reaction apparatus according to the first embodiment of the present invention includes a body portion 10 in which a surface in the first direction d1 is opened to provide a space for causing a catalytic reaction to a fluid and a catalyst portion 20 located inside the body portion 10 to cause a catalytic reaction with a fluid, wherein the catalyst portion 20 includes a first catalyst portion 21 and a second catalyst portion 22 positioned below the first catalyst portion 21.

The catalyst portion 20 may include at least one metal selected from the group consisting of titanium (Ti), vanadium (V), niobium (Nb), zirconium (Zr), bismuth (Bi), tungsten (W), molybdenum (Mo) and palladium (Pd) as a component for causing a catalytic reaction with the fluid.

In more detail, the component ratio (element ratio) of the catalyst portion 20 may be palladium (Pd) 0.1 to 0.5: molybdenum (Mo) 0.3 to 1:niobium (Nb) 2 to 5:zirconium (Zr) 0.5 to 3:bismuth (Bi) 0.3 to 2:tungsten (W) 0.3 to 1.5:vanadium (V) 3 to 8:titanium (Ti) 80 to 90.

The component ratio (element ratio) of the catalyst portion 20 according to another embodiment of the present invention may be tungsten (W) 0.2 to 1.7:iron (Fe) 30 to 86:chromium (Cr) 5 to 19:vanadium (V) 3 to 8:titanium (Ti) 25 to 90.

Meanwhile, as will be described later, the catalyst portion 20 includes a first catalyst portion 21 and a second catalyst portion 22, and the first catalyst portion 21 and the second catalyst portion 22 may be provided to contact each other via spot welding or brazing and located inside the body portion 10. This has the effect of enabling more rigid mounting in the body portion while minimizing damage to the first catalyst portion 21 and the second catalyst portion 22. That is, in the bonding process of the first catalyst portion 21 and the second catalyst portion 22 through spot welding or brazing, while maintaining the strength of the first catalyst portion 21 and the second catalyst portion 22, it can prevent distortion, thermal deformation, and damage due to thermal stress.

Figure 2:
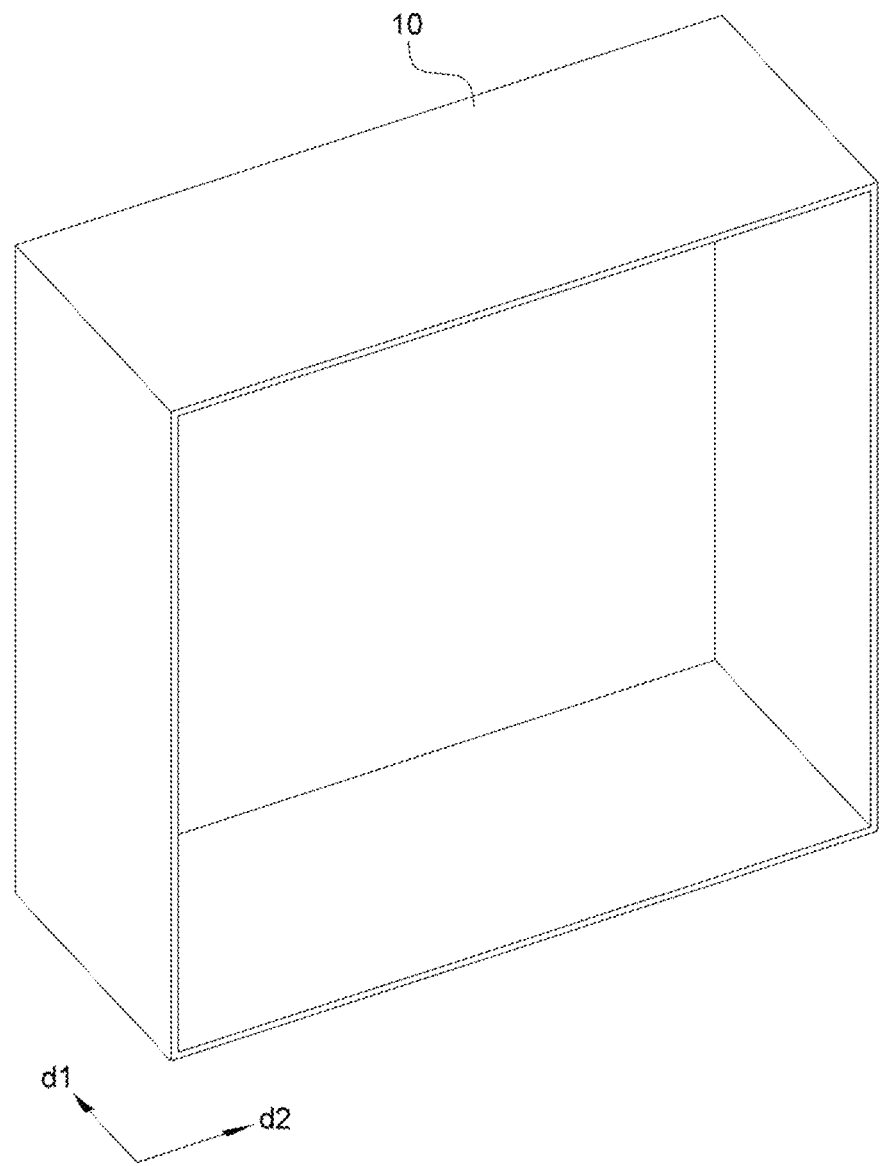
FIG. 2 is a perspective view showing a body portion according to the first embodiment of the present invention.

FIG. 2 is a perspective view showing the body portion 10 according to the first embodiment of the present invention.

The body portion 10 is configured to provide a space for the catalytic reaction of the fluid. To this end, the body portion 10 is provided in the form of a housing in which the surface in the first direction d1 is opened. In detail, the upper surface of the body portion 10 may be opened to insert the first catalyst portion 21 and the second catalyst portion 22 described later. Since the body portion 10 is provided, it is possible to further increase the time during which the fluid located therein comes into contact with the first catalyst portion 21 and the second catalyst portion 22, thereby maximizing catalytic performance. In addition, as shown in FIG. 2, the body portion 10 has a square frame shape with a smooth surface for fixing the first catalyst portion 21 and the second catalyst portion 22 to have a plate shape with a flat surface, or the surface of the body portion 10 may be patterned in a specific shape (see FIGS. 3 to 6).

Figure 3:
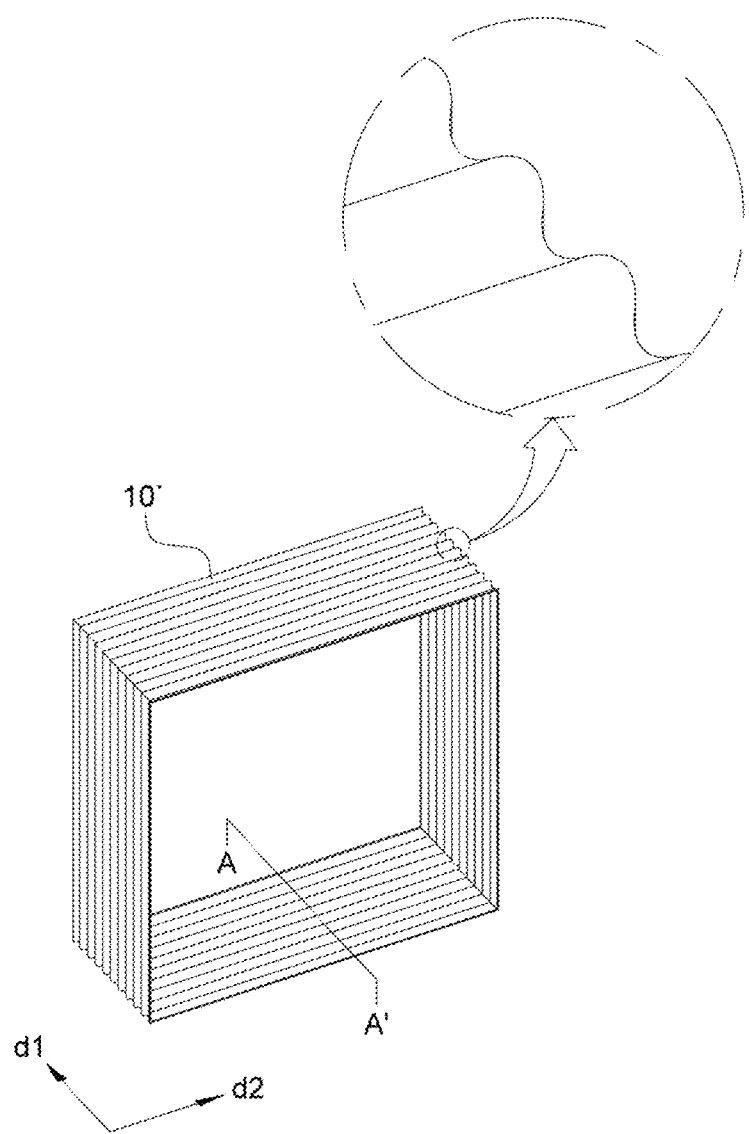
FIG. 3 is a perspective view showing a body portion according to another embodiment of the present invention.
Figure 4:
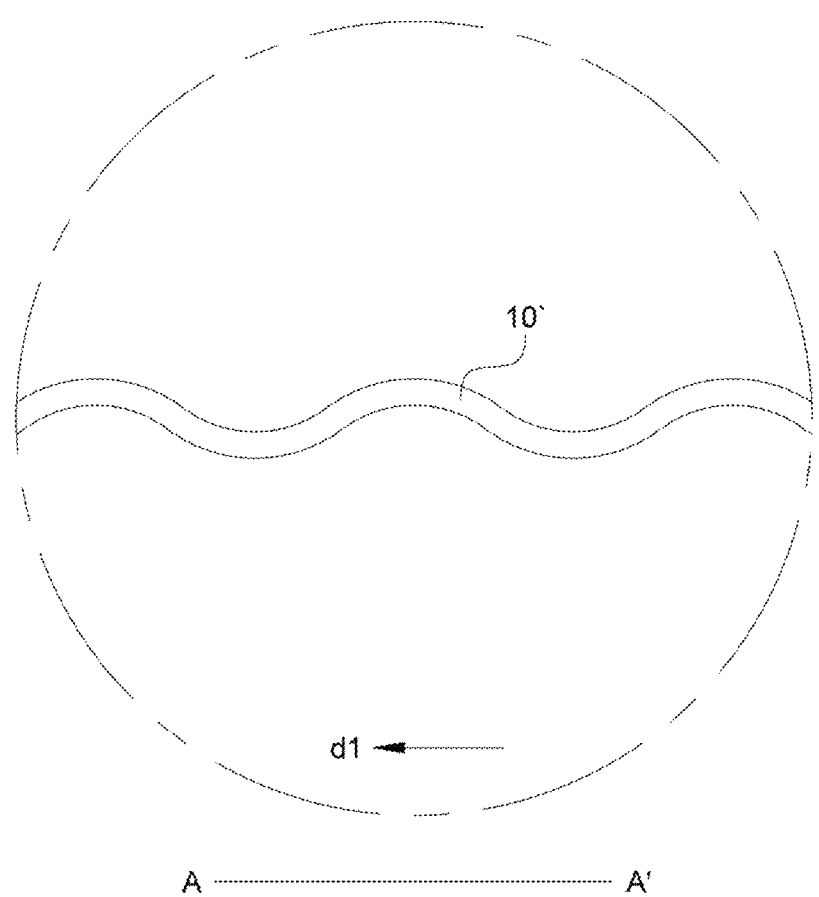
FIG. 4 is a cross-sectional view of the body portion according to FIG. 3.
Figure 5:
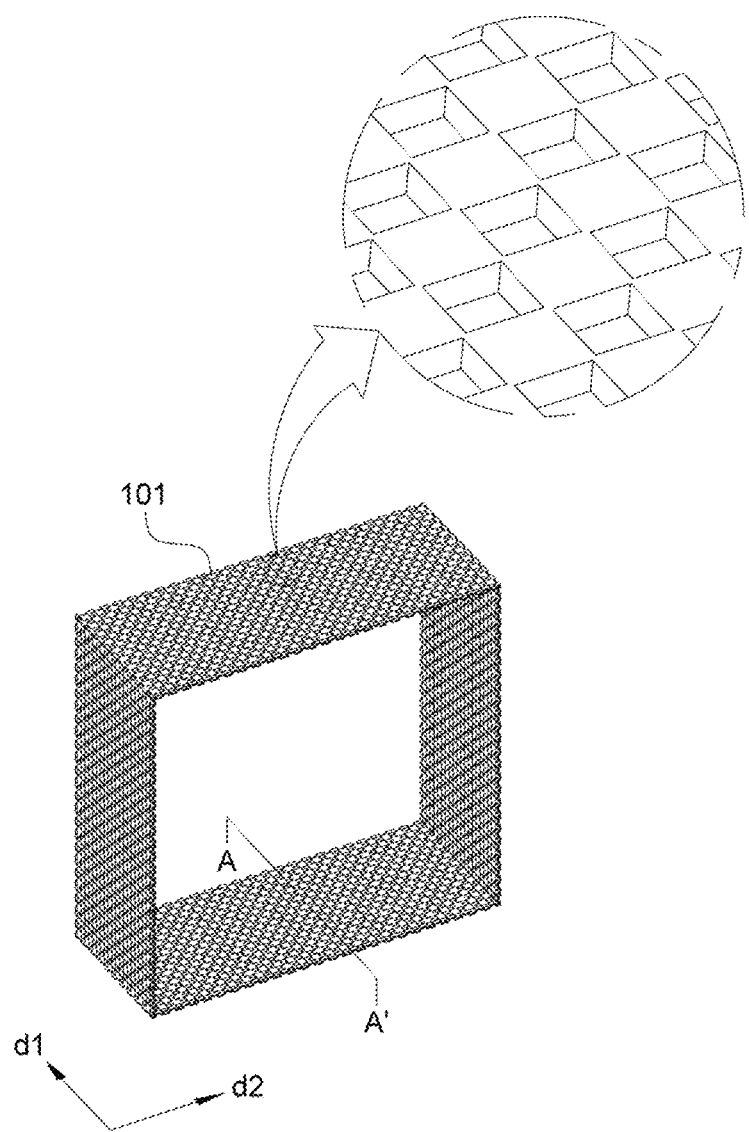
FIG. 5 is a perspective view showing a body portion according to still another embodiment of the present invention.
Figure 6:
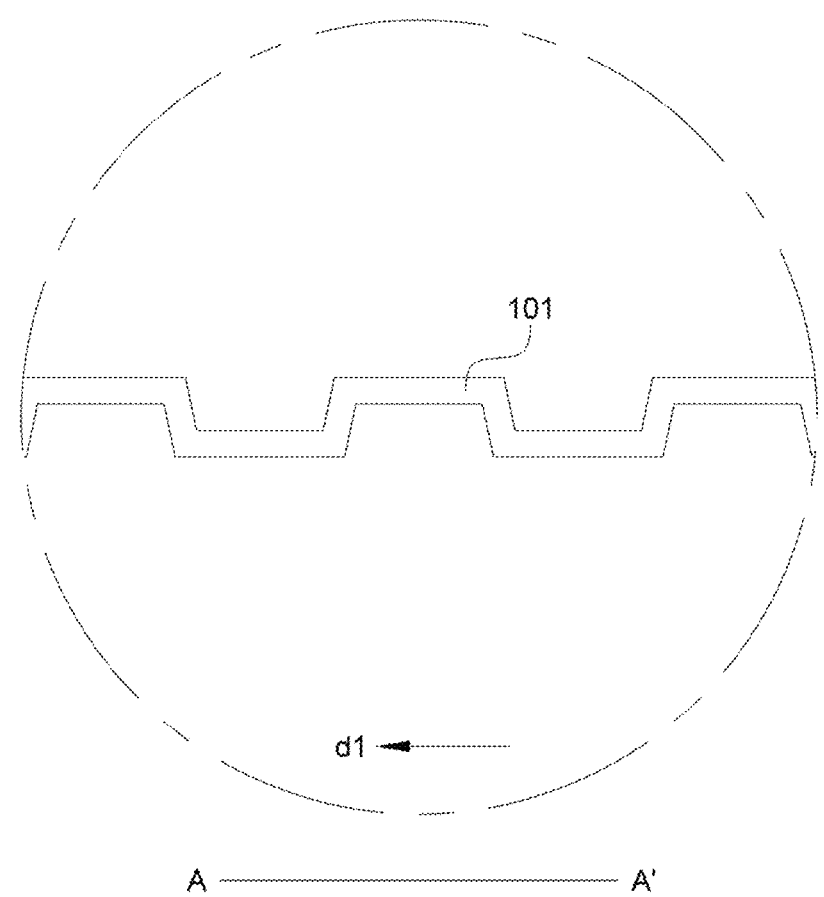
FIG. 6 is a cross-sectional view of the body portion according to FIG. 5.

FIG. 3 is a perspective view showing a body portion 10' according to another embodiment of the present invention; FIG. 4 is a cross-sectional view of the body portion 10' according to FIG. 3; FIG. 5 is a perspective view showing a body portion 10" according to still another embodiment of the present invention; and FIG. 6 is a cross-sectional view of the body portion 10" according to FIG. 5. FIGS. 3 to 6 are diagrams for explaining all the various embodiments of the body portion, and two types of body portions 10' and 10" according to other embodiments of the invention and a body portion 10 according to an embodiment of this invention are described sequentially.

As described above, the body portions 10' and 10" may be provided with a surface patterned in a specific shape. In detail, referring to FIGS. 3 and 4, the surface of the body portion 10' may be formed to have a wavy cross-section when viewed in the second direction d2. In detail, the cross-section of the body portion 10' facing the first direction d1 may be formed in a rounded shape to have a predetermined first curvature. Through this, the upper end of the first catalyst portion 21 positioned inside the body portion 10' can be in point contact, so that a more robust structure between the first catalyst portion 21 and the body portion 10' can be established. In addition, when the body portion 10' and the first catalyst portion 21 are in surface contact with each other, the fluid causes a catalytic reaction inside the body portion 10', increasing the residence time inside the body portion 10' and has the effect of maximizing catalyst performance.

Referring to FIGS. 5 and 6, the surface of the body portion 10" may be formed to have a concave-convex shape, a square shape, or the like, when viewed in the second direction d2. In detail, the surface of the body portion 10" may be provided with a pattern portion 101 formed of a concave-convex shape, a square shape, or the like along the first direction d1 from the front surface of a body portion 10 protruding outward and inward from the surface thereof. That is, the surface of the body portion 10" may be provided with a plate-like cross-section in the second direction d2 as the pattern portion 101 protruding outward relative to the surface of body portion 10" and the pattern portion 101 protruding inward are repeatedly patterned and formed toward the first direction d1. Here, in the case of a pattern portion 101 that is provided in a repeated arrangement from the surface of the body portion 10" toward the inside direction, it may be provided to be in contact with or spaced apart from the upper end of the first catalyst portion 21 that is located in the below the surface thereof. When the body portion 10" and the upper end of the first catalyst portion 21 are brought into contact with each other, more robust fixing between the first catalyst portion 21 and body portion 10" is possible in the course of the catalytic reaction, and when the upper ends of the body portion 10" and first catalyst portion 21 are spaced apart from each another, a path for catalytic reaction can be obtained while the fluid is circulated through the first catalyst portion 21 and body portion 10" and catalyst performance is remarkably enhanced.

Through the surface configuration of the body portions 10' and 10" as described above, there is the effect of remarkably increasing the fixing and catalytic performance of the more rigid first catalyst portion 21 and the second catalyst portion 22. In addition, the body portion 10',10" as described above can have an effect of allowing thickness and weight reductions. In addition, when compared with the body portion 10 according to an embodiment of the present invention, the body portions 10', 10" according to other embodiments of the present invention have greater durability against an external force applied toward the first direction. Accordingly, it is possible to prevent a decrease in tensile strength and the like while reducing the thickness of the body portion, thereby reducing the unit costs required for the production of the body portion, so that productivity is maximized. Meanwhile, the body portions 10' and 10" having a flat surface or having a wavy cross-section or a square cross-sectional shape as described above may be applied to one embodiment and another embodiment of the present invention to be described later.

Figure 7:
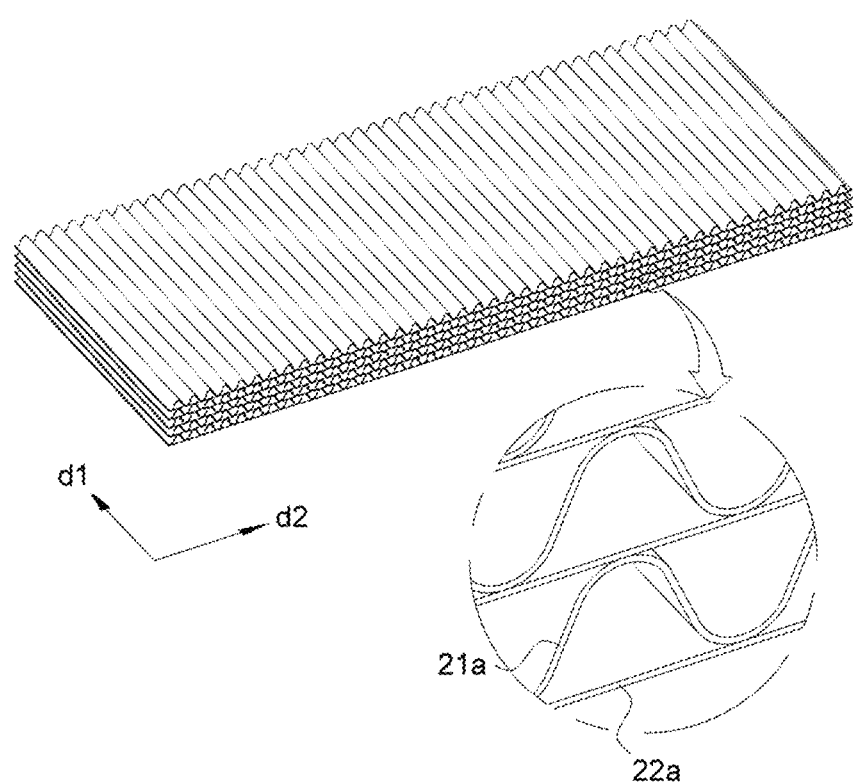
FIG. 7 is a view showing a first catalyst portion and a second catalyst portion according to the first embodiment of the present invention.
Figure 8:
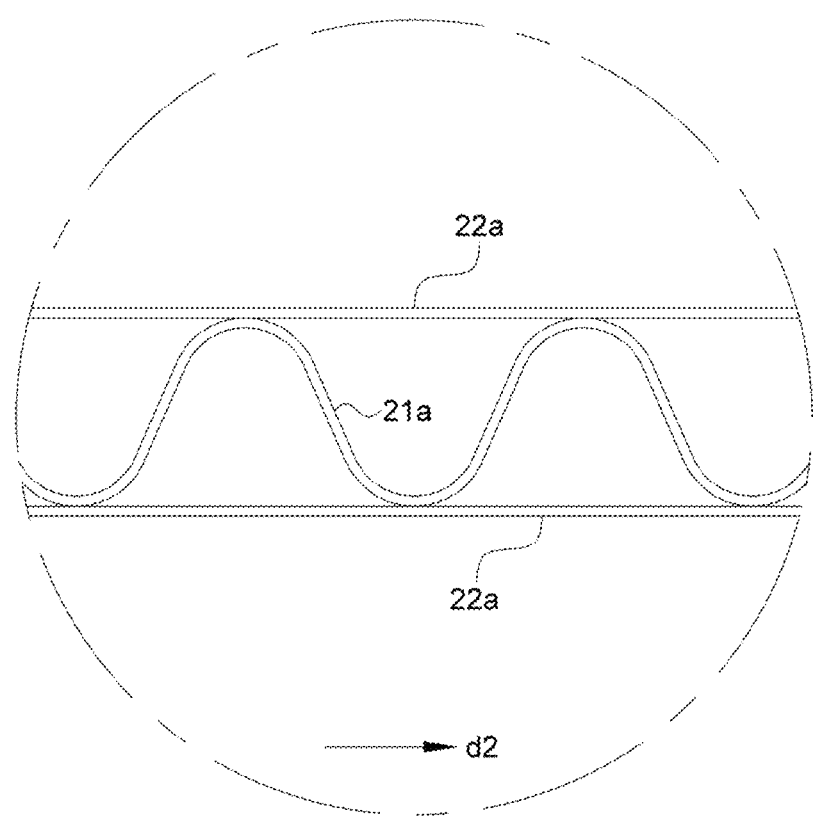
FIG. 8 is a cross-sectional view of the first catalyst portion and the second catalyst portion according to FIG. 7.
Figure 9:
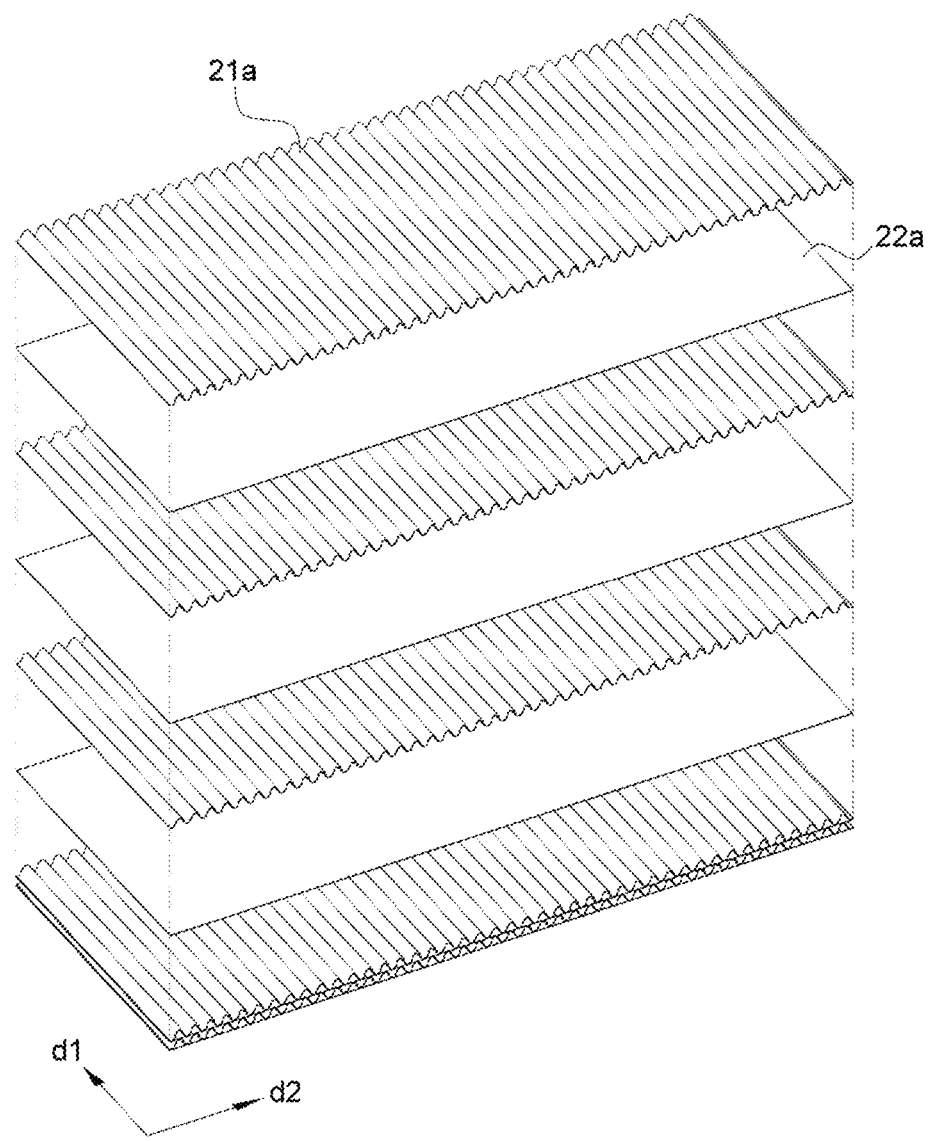
FIG. 9 is a view showing the separation of the first catalyst portion and the second catalyst portion according to FIG. 7.

FIG. 7 is a view showing the first catalyst portion 21a and the second catalyst portion 22a according to the first embodiment of the present invention; FIG. 8 is a cross-sectional view of the first catalyst portion 21a and the second catalyst portion 22a according to FIG. 7; and FIG. 9 is a view showing that the first catalyst portion 21a and the second catalyst portion 22a according to FIG. 7 are separated. Here, a plate-shaped second catalyst portion 22a formed in a horizontal direction may be positioned below the first catalyst portion 21a, which will be described later.

The catalyst portion 20 is configured to cause a catalytic reaction by coming into contact with the fluid to remove and reduce impurities and harmful substances such as nitrogen oxides contained in the fluid. To this end, the catalyst portion 20 is positioned inside the body portion 10 and is divided into a first catalyst portion 21a and a second catalyst portion 22a. In addition, the first catalyst portion 21a and the second catalyst portion 22a form a group, and a plurality of the groups are arranged in the vertical direction and positioned inside the body portion 10.

The first catalyst portion 21a is provided to have a wavy cross-section in the first direction d1. In detail, the first catalyst portion 21a has a wavy cross-sectional shape when viewed from the first direction d1 from the front to the rear of the body portion 10. That is, the first catalyst portion 21a has a corrugated cross-sectional shape in which the heights of the peak portions and the valley portions are uniform by being rounded with a predetermined second curvature based on the first direction d1, and the first catalyst portion 21a having such a cross-section is formed to extend in the direction d1.

The second catalyst portion 22a is configured to support the above-described first catalyst portion 21a and at the same time induce higher catalytic performance. To this end, the second catalyst portion 22a is positioned below the first catalyst portion 21a and is formed in a plate-like shape, and is provided so that the upper surface and the lower surface are in contact with the lower end of a first catalyst portion 21a located in the upper direction and the upper end of another first catalyst portion 21a disposed in a downward direction, respectively. In detail, the upper surface of the second catalyst portion 22a is in contact with the valley portion, which is the lower end of the first catalyst portion 21a positioned in the upward direction, and the lower surface of the second catalyst portion 22a is in contact with the peak portion, which is the upper end of another first catalyst portion 21a positioned in the downward direction. Here, the first catalyst portion 21a and the second catalyst portion 22a are positioned so as to be in contact with each other, but may be arranged to make point contact or surface contact. In detail, when the first catalyst portion 21a and the second catalyst portion 22a are in point contact with each other, an easier catalytic reaction may occur in the fluid positioned between the first catalyst portion 21a and the second catalyst portion 22a. In addition, when the first catalyst portion 21a and the second catalyst portion 22a are in surface contact with each other, more rigid fixing between the first catalyst portion 21a and the second catalyst portion 22a is possible.

Figure 10:
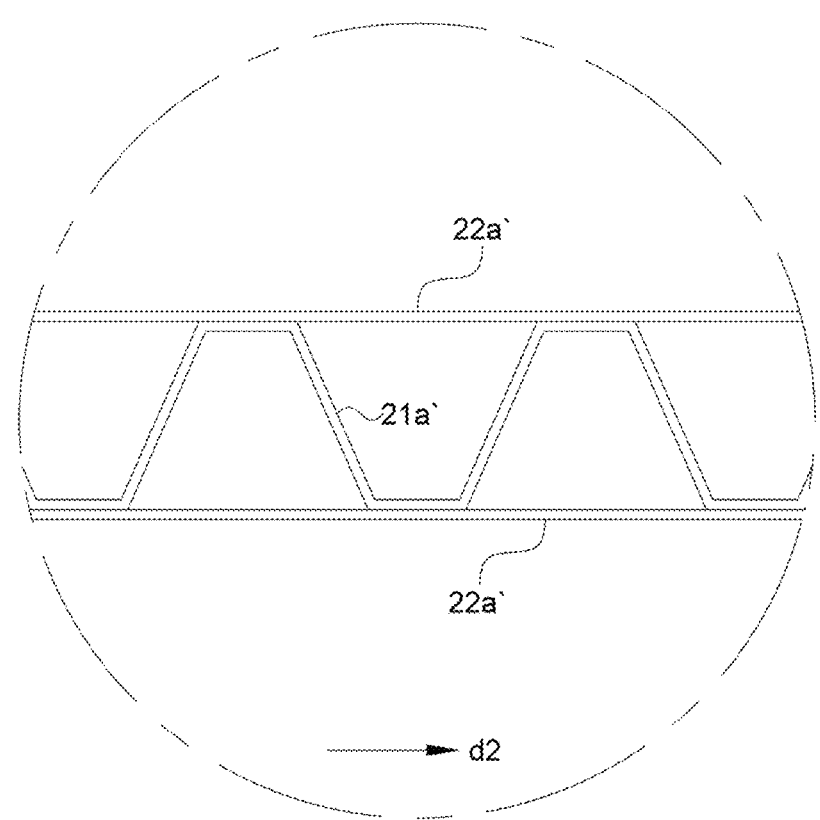
FIG. 10 is a cross-sectional view of a first catalyst portion and a second catalyst portion according to another embodiment of the present invention.

FIG. 10 is a cross-sectional view of a first catalyst portion 21a' and a second catalyst portion 22a' according to another embodiment of the present invention.

In the case of the first catalyst portion 21a ' according to FIG. 10, the cross-sectional shape is provided to be modified as compared to the above-described embodiment. In detail, the first catalyst portion 21a' according to another exemplary embodiment of the present invention has a cross-section of a concave-convex, trapezoidal, or square shape with respect to the first direction d1. In detail, when viewed from the first direction d1, since the cross section of the first catalyst portion 21a' has an irregular shape, a trapezoidal shape, or a square shape that is provided convex toward the upper direction, the first catalyst portion 21 a' has a stepped shape when viewed based on the first direction d1, and such a cross section shape is extended and formed along the first direction d1. Through this, the area in which the first catalyst portion 21a ' comes in contact with the fluid increases, so that catalytic performance can be increased. In addition, since the first catalyst portion 21a' and the plate-shaped second catalyst portion 22a' contact each other, a more rigid fixed state is maintained, and the contact area with the fluid can be increased, so that catalytic reaction efficiency can be maximized.

Figure 11:
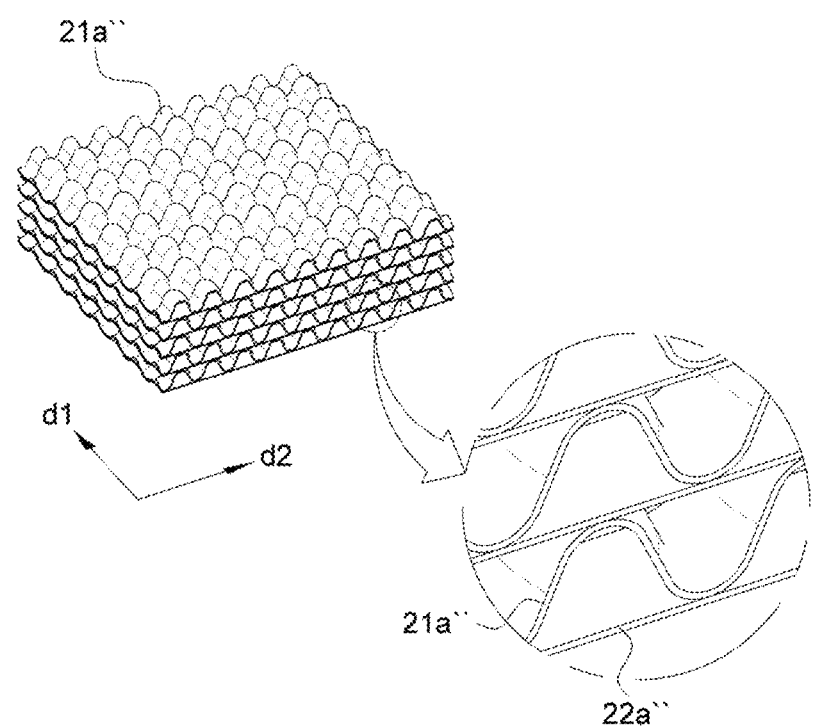
FIG. 11 is a view showing a first catalyst portion and a second catalyst portion according to still another embodiment of the present invention.
Figure 12:
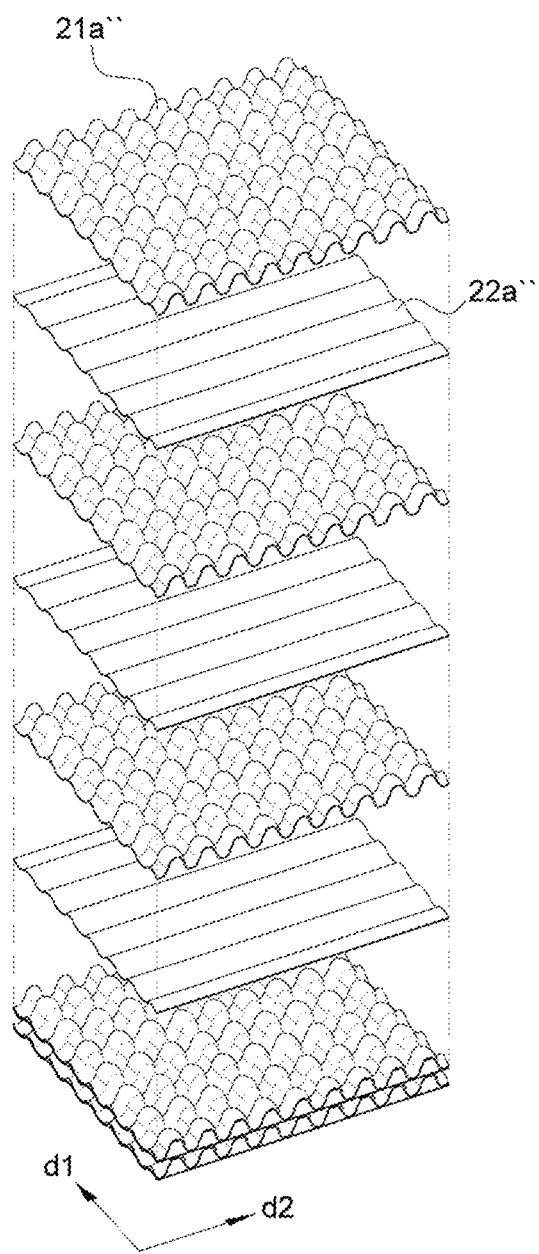
FIG. 12 is a view showing the separation of the first catalyst portion and the second catalyst portion according to FIG. 11.
Figure 13A:
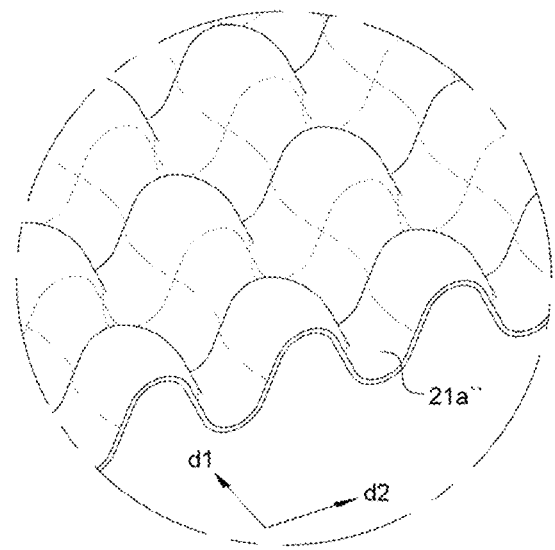
FIGS. 13A-13B are enlarged views of the first catalyst portion and the second catalyst portion according to FIG. 11.
Figure 13B:
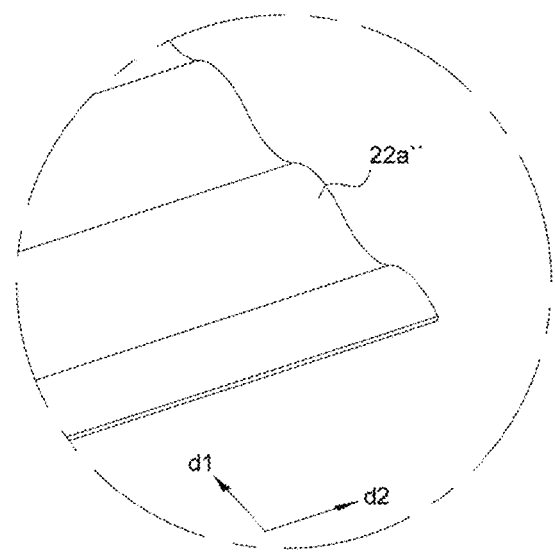

FIG. 11 is a view showing a first catalyst portion 21a" and a second catalyst portion 22a" according to still another embodiment of the present invention; FIG. 12 is a view showing that a first catalyst portion 21a' and the second catalyst portion 22a" according to FIG. 11 are separated; and FIGS. 13A-13B are enlarged views of the first catalyst portion 21a" and the second catalyst portion 22a" according to FIG. 11.

In the case of the first catalyst portion 21a" and the second catalyst portion 22a" according to FIGS. 11 to 13, when compared to the first catalyst portion 21a" and the second catalyst portion 22a" according to FIGS. 7 to 9, a cross-sectional shape in the second direction d2 is formed to be different. In detail, the first catalyst portion 21a" may have a wavy cross-section with respect to the second direction d2. In detail, the first catalyst portion 21a" has a wavy cross-section when viewed from the first direction d1, and the cross section viewed in the second direction d2 orthogonal to the first direction d1 may also be formed to have a wavy shape. Accordingly, when the first catalyst portion 21a" is viewed in the first direction d1 or the second direction d2, it is possible to make more contact with the fluid and maximize the efficiency for the catalytic reaction as compared with that provided in a general flat plate shape, and to maintain a more robust shape even if the thickness is reduced as compared to the flat plate-shaped first catalyst portion 21a", and to reduce the weight. On the other hand, a second catalyst portion 22a" is provided below the first catalyst portion 21a" according to FIGS. 11 to 13, and the second catalyst portion 22a" may be provided in the form of a plate or may have a wavy cross-section with respect to the second direction d2. When the second catalyst portion 22a" is provided in a plate shape, more rigid fixing between the first catalyst portion 21a" and the second catalyst portion 22a" is possible.

In addition, when the second catalyst portion 22a" has a wavy cross-sectional shape when viewed in the second direction d2 (refer to FIGS. 12 and 13), a contact area between the first catalyst portion 21a" and the second catalyst portion 22a" is reduced. Correspondingly, the area in which the first catalyst portion 21a" and the second catalyst portion 22a" can contact the fluid increases. Therefore, it is possible to increase the area for the fluid to catalytically react and the contact time can be increased, leading to an ultimate increase in catalytic performance.

Figure 14:
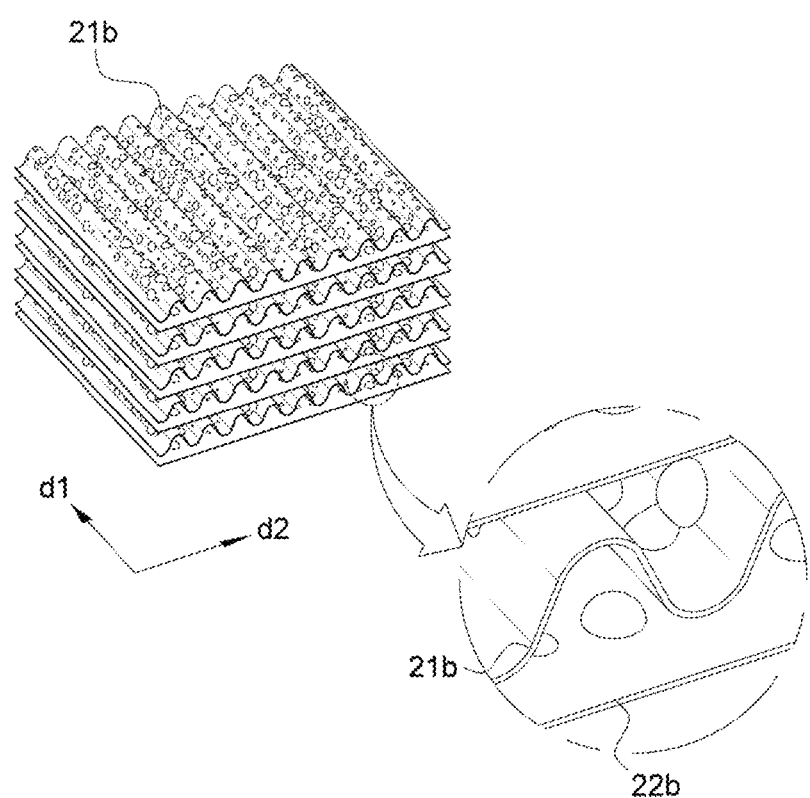
FIG. 14 is a view showing a first catalyst portion and a second catalyst portion according to yet another embodiment of the present invention.
Figure 15:
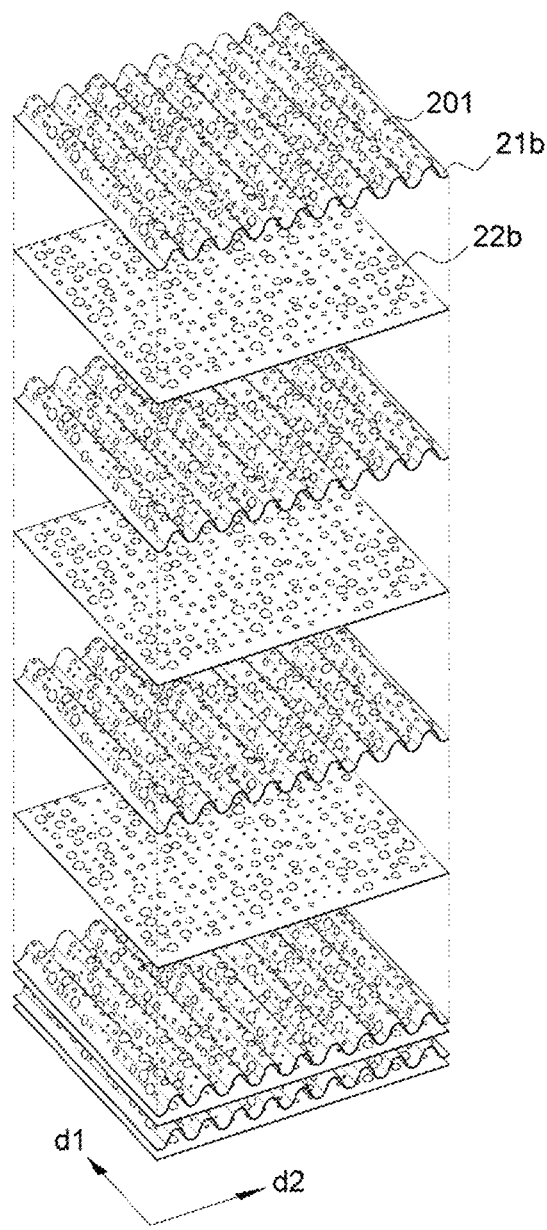
FIG. 15 is a view showing the separation of the first catalyst portion and the second catalyst portion according to FIG. 14.
Figure 16A:
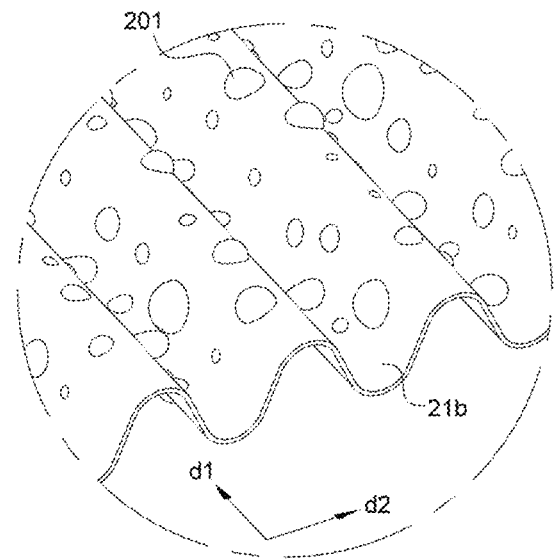
FIGS. 16A-16B are enlarged views of the first catalyst portion and the second catalyst portion according to FIG. 14.
Figure 16B:
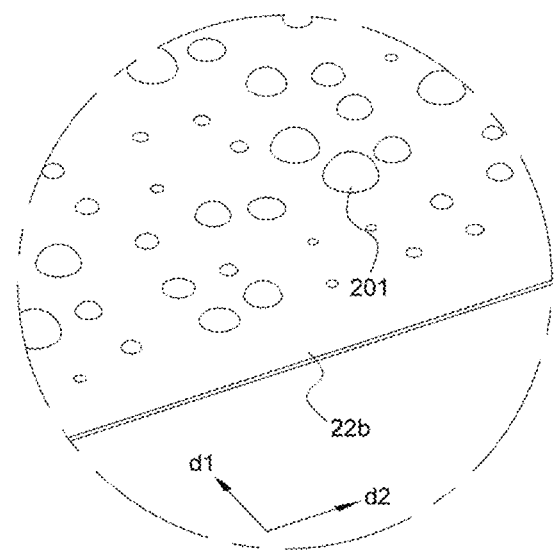

FIG. 14 is a view showing a first catalyst portion 21b and a second catalyst portion 22b according to yet another embodiment of the present invention; FIG. 15 is a view showing that a first catalyst portion 21b and the second catalyst portion 22*b* according to FIG. 14 are separated; and FIGS. 16A-16B are enlarged views of the first catalyst portion 21*b* and the second catalyst portion 22*b* according to FIG. 14. The configuration of a protruding portion 201, which will be described later with reference to FIGS. 14 to 16, is not limited to the first catalyst portion 21*b*, but is also provided on the surface of the second catalyst portion 22*b* and may be adopted in the same manner. Additionally, the configuration of the protruding portion 201, an embossed portion 202, a convex portion 203 and a concave portion 204 which will be described later may be provided on the surface of the first catalyst portion 21*a* and the second catalyst portion 22*a* according to FIGS. 7 to 10. That is, the protruding portion 201, the embossed portion 202, the convex portion 203, and the concave portion 204 are provided in the first catalyst portion 21*b* and the plate-shaped second catalyst portion 22*b* having cross-sectional shapes such as wavy, square, and trapezoidal shapes, when viewed in the first direction d1. However, the cross-section of the first catalyst portion 21*b* and the second catalyst portion 22*b* as viewed from the second direction d2 as described above may be provided in a plate shape as shown in FIGS. 7 to 10, or may be formed in a wave-like shape as in FIGS. 11 to 13.

The first catalyst portion 21*b* and the second catalyst portion 22*b* according to FIGS. 14 to 16 are extended and formed in the first direction d1 while maintaining a cross-section in the second direction d2, as in the case of the first catalyst portions 21*a*' and second catalyst portion 22*a*' according to FIG. 10 as in the first catalyst portion 21*a* and the second catalyst portion 22*a* described above in FIGS. 7 and 8, and the surface may be further provided with the protruding portion 201.

The protruding portion 201 is a configuration provided for easier contact with the fluid. To this end, the protruding portion 201 is provided on the upper surface or the lower surface of the first catalyst portion 21*b* or the second catalyst portion 22*b*. In addition, the protruding portion 201 is engraved or embossed in a hemispherical shape from the surface of the first catalyst portion 21*b* or the second catalyst portion 22*b*. Here, the shape of the protruding portion 201 is not limited to a hemispherical shape, and may be formed in various ways, such as a shape in which a square pyramid is engraved, a shape in which a triangular pyramid is engraved or embossed, and the like. In addition, when the protruding portion 201 is provided on both the upper surface or the lower surface of the first catalyst portion 21*b*, there may be no first catalyst portion 21*b* located on the peak portion, which is the upper end, and the valley portion, that is the lower end, of the second catalyst portion 21. This is to prevent damage in advance due to an excessive reduction in the thickness of the first catalyst portion 21*b*. Meanwhile, the arrangement of the protruding portion 201 as described above may be equally adopted for the embossed portion 202 to be described later in FIG. 17.

In addition, the protruding portion 201 may be provided in plurality, but may be formed to have a regular arrangement from the surface of the first catalyst portion 21*b* or the second catalyst portion 22*b*. In this case, the fluid inside the body portion 10 can make more surface contact, and a uniform catalytic reaction can occur with the fluid positioned inside the body portion 10, so that it is possible to remove and reduce harmful substances such as nitrogen oxide at one time. The arrangement of the protruding portion 201 as described above may be equally adopted for the embossed portion 202 to be described later in FIG. 17.

Additionally, a plurality of protruding portions 201 may be provided, and may be formed in an irregular pattern on the surfaces of the first catalyst portion 21*b* and the second catalyst portion 22*b*. Accordingly, since the fluid located inside the body portion 10 is in contact with the first catalyst portion 21*b* and the second catalyst portion 22*b* to have a catalytic reaction for a longer time, more reliable harmful substance removal and reduction through the catalytic reaction of the fluid are possible. Meanwhile, the arrangement of the protruding portion 201 as described above may be equally adopted for the embossed portion 202 to be described later in FIG. 17.

Figure 17:
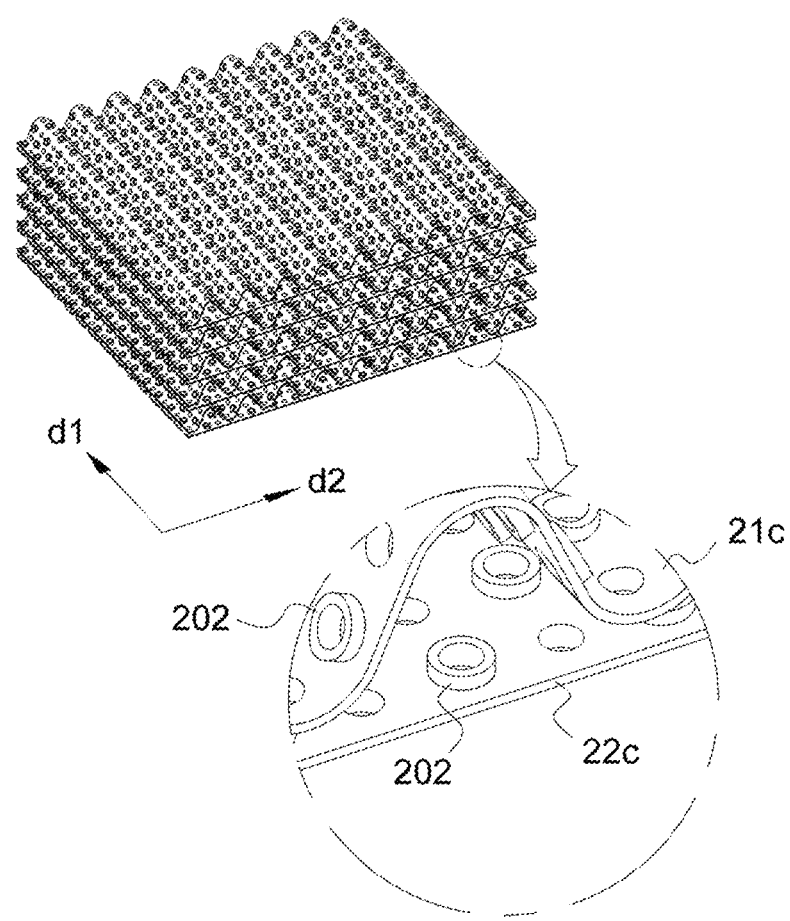
FIG. 17 is a view showing a first catalyst portion and a second catalyst portion according to yet another embodiment of the present invention.
Figure 18:
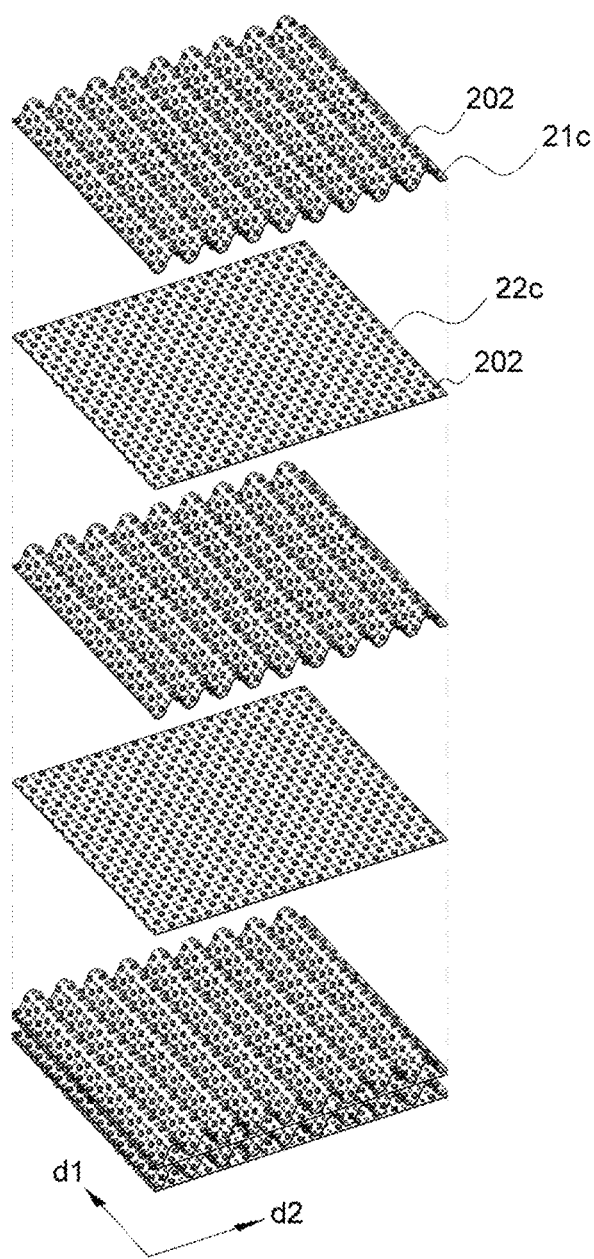
FIG. 18 is a view showing the separation of the first catalyst portion and the second catalyst portion according to FIG. 17.
Figure 19A:
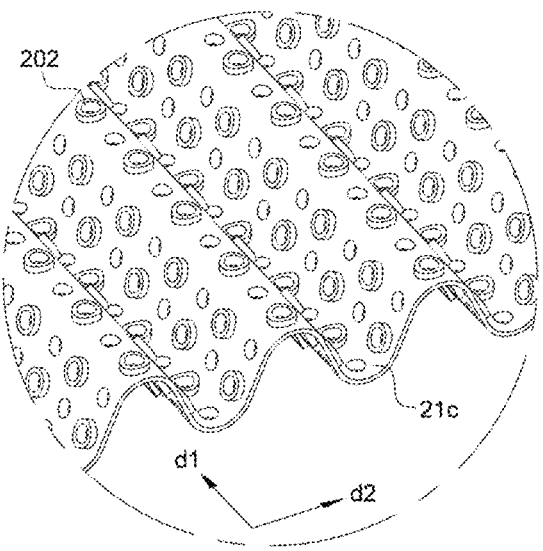
FIGS. 19A-19B are enlarged views of the first catalyst portion and the second catalyst portion according to FIG. 17.
Figure 19B:
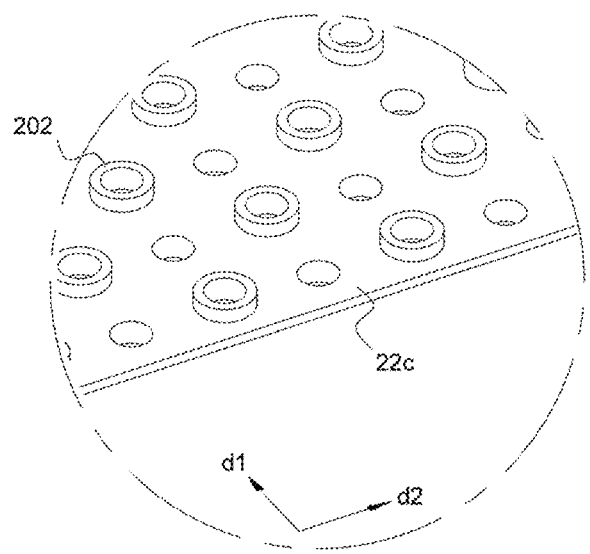

FIG. 17 is a view showing a first catalyst portion 21*c* and a second catalyst portion 22*c* according to yet another embodiment of the present invention; FIG. 18 is a view showing that a first catalyst portion 21*c* and the second catalyst portion 22*c* according to FIG. 17 are separated; and FIGS. 19A-19B are enlarged views of the first catalyst portion 21*c* and the second catalyst portion 22*c* according to FIG. 17.

The embossed portion 202 is configured to maximize the catalytic reaction in the same way as the above-described protruding portion 201. To this end, a plurality of embossed portions 202 are provided on the upper surface or the lower surface of the first catalyst portion 21*c* or the second catalyst portion 22*c*. Also, the embossed portion 202 may be formed in a shape in which the first catalyst portion 21*c* and the second catalyst portion 22*c* are repeatedly tanged through an opening means such as a punch. In detail, when the opening means applies a force from the upward direction to the downward direction of the first catalyst portion 21*c* or the second catalyst portion 22*c* to carry out repeated opening, the embossed portion 202 has a shape protruding downward from the lower surface of the first catalyst portion 21*c* or the second catalyst portion 22*c*. On the other hand, when the opening means performs the pressing and the opening in the downward direction of the first catalyst portion 21*c* or the second catalyst portion 22*c* toward the upward direction, the embossed portions 202 are formed to protrude upward from the top surface of the second catalyst portion 22*c* or the first catalyst portion 21*c*. In addition, when the embossed portion 202 is provided on both the upper and lower surfaces of the first catalyst portion 21*c* and the second catalyst portion 22*c*, the embossed portion 202 may not be provided in the upward direction of the peak portion of the first catalyst portion 21*c* and in the downward direction of the valley portion thereof. This is to prevent in advance that the first catalyst portion 21*c* and the second catalyst portion 22*c* are not in point contact or surface contact due to the embossed portion 202.

As a more preferred embodiment, the embossed portion 202 may be provided in plurality and may be formed to have a regular arrangement on the surface of the first catalyst portion 21*c* or the second catalyst portion 22*c*. This has the effect of inducing a more uniform catalytic reaction with respect to the fluid positioned inside the body portion 10.

As another more preferred embodiment, the plurality of embossed portions 202 may have an irregular arrangement on the surface of the first catalyst portion 21*c* or the second catalyst portion 22*c*. This leads to an effect of increasing catalyst performance by further increasing the contact time of the fluid positioned inside the body portion 10 with the first catalyst portion 21*c* or the second catalyst portion 22*c*.

Figure 20:
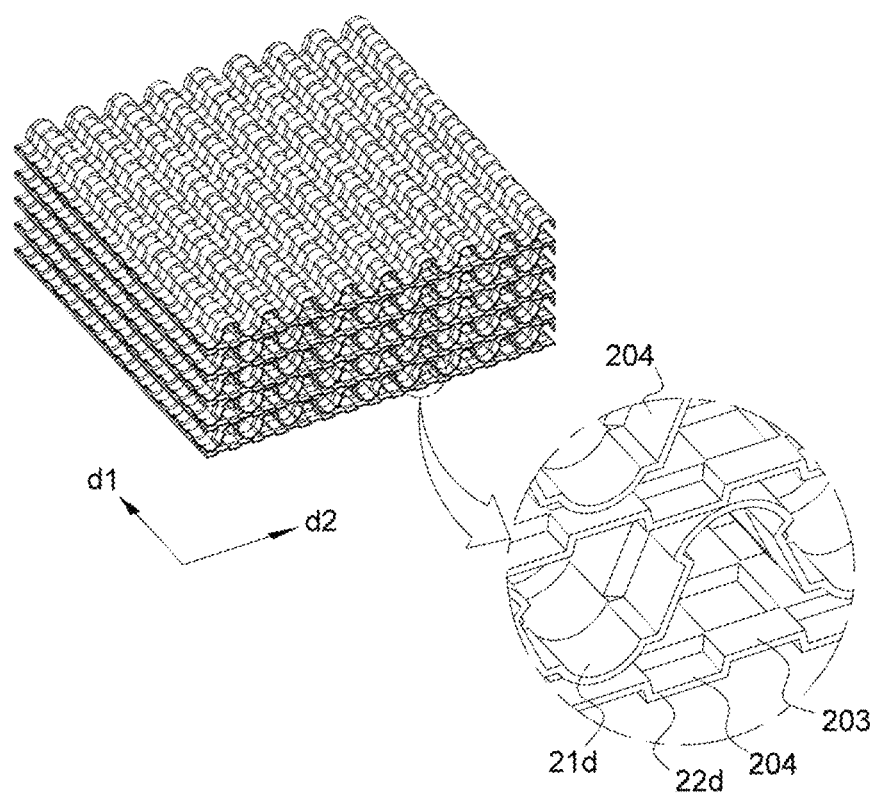
FIG. 20 is a view showing a first catalyst portion and a second catalyst portion according to yet another embodiment of the present invention.
Figure 21:
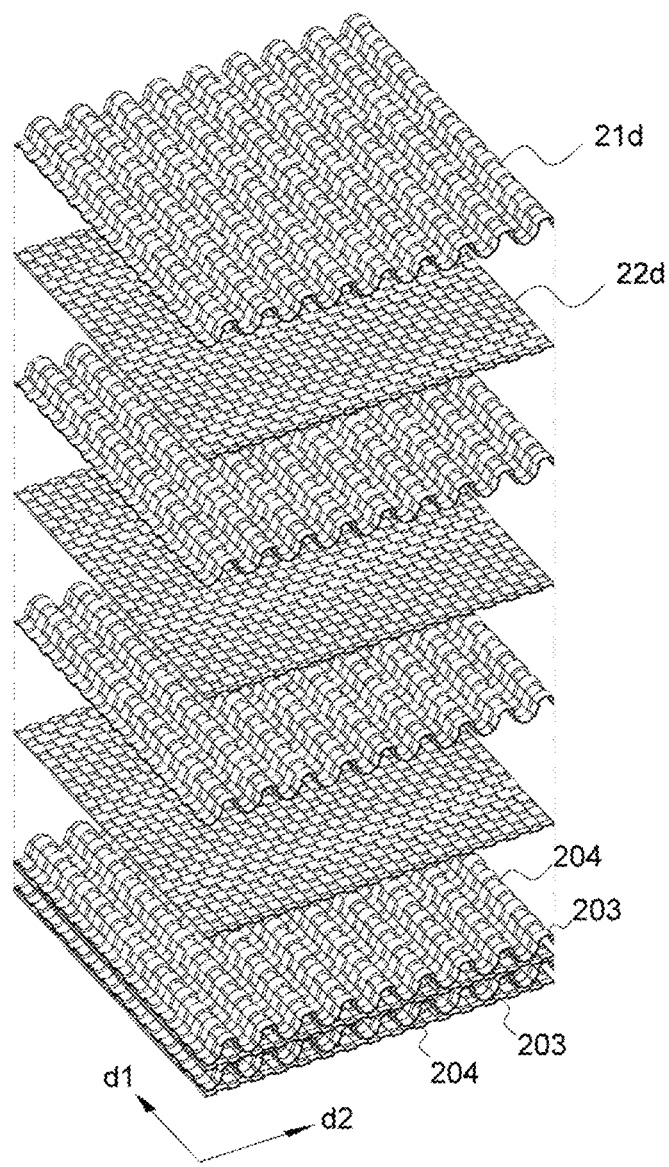
FIG. 21 is a view showing the separation of the first catalyst portion and the second catalyst portion according to FIG. 20.
Figure 22A:
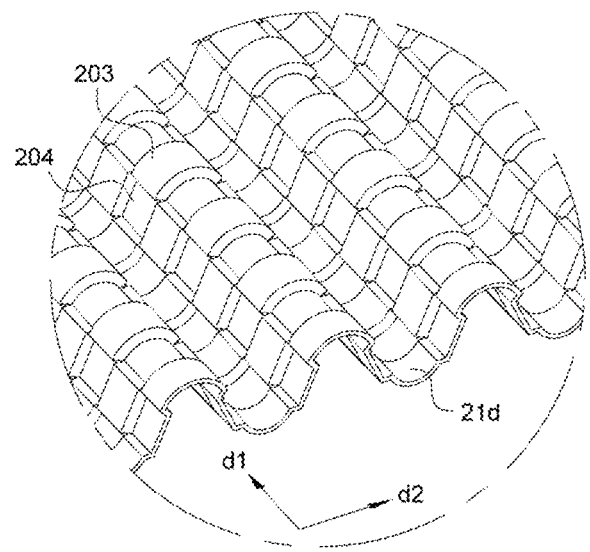
FIGS. 22A-22B are enlarged views of the first catalyst portion and the second catalyst portion according to FIG. 20.
Figure 22B:
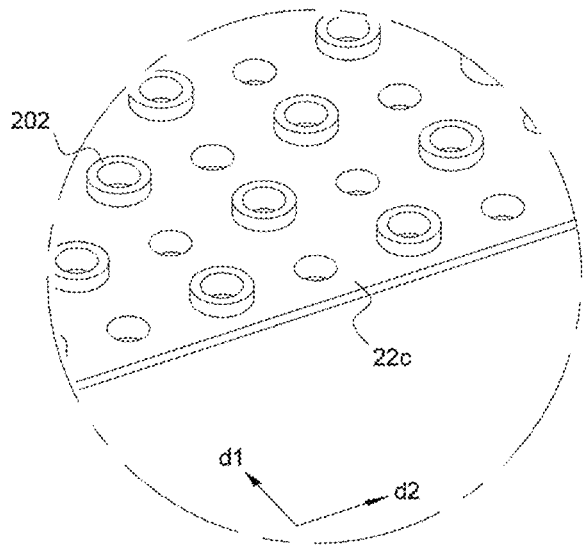

FIG. 20 is a view showing a first catalyst portion 21*d* and a second catalyst portion 22*d* according to yet another embodiment of the present invention; FIG. 21 is a view showing that a first catalyst portion 21*d* and the second catalyst portion 22*d* according to FIG. 20 are separated; and FIGS. 22A-22B are enlarged views of the first catalyst portion 21*d* and the second catalyst portion 22*d* according to FIG. 20. The configuration of the convex portion 203 and the concave portion 204 may be provided not only on the surface of the first catalyst portion 21*d* but also on the surface of the second catalyst portion 22*d* positioned in the downward direction. The convex portion 203 and the concave portion 204 are provided for the same purpose as the protruding portion 201 and the embossed portion 202 described above with reference to FIGS. 14 to 19. In detail, the convex portion 203 and the concave portion 204 are provided to increase the catalytic performance of the fluid inside the body portion 10. To this end, the convex portion 203 and the concave portion 204 are provided on the surface of the first catalyst portion 21*d* or the second catalyst portion 22*d*. Here, the convex portions 203 are formed to project upward and downward from the upper surface and the lower surface of the first catalyst portion 21*d* or the second catalyst portion 22*d*, and the concave portion 204 are formed by being engraved on the upper and lower surfaces of first catalyst portion 21*d* and second catalyst portion 22*d*. Additionally, the convex portion 203 and the concave portion 204 are provided in plurality and the convex portion 203 and the concave portion 204 can have various cross-sectional shapes such as an irregular shape and a trapezoidal shape. Accordingly, the surface of the first catalyst portion 21*d* or the second catalyst portion 22*d* is formed with a step difference corresponding to the total height of the convex portion 203 and the concave portion 204 and has a surface of a grid array. Through this, the retention time of the fluid in contact with the first catalyst portion 21*d* or the second catalyst portion 22*d* inside the body portion 10 may be increased to more easily derive a catalytic reaction.

Through a series of configurations of the present invention, by providing the first catalyst portion 21 and the second catalyst portion 22 in a specific cross-sectional form, it is possible to prevent damage to the first catalyst portion 21 or the second catalyst portion 22 during movement of the fluid. In addition, through the body portion 10 according to the present invention, the frame thickness can be made thinner than in the related art, and catalytic performance can be increased to increase efficiency.

Second Embodiment

Figure 23:
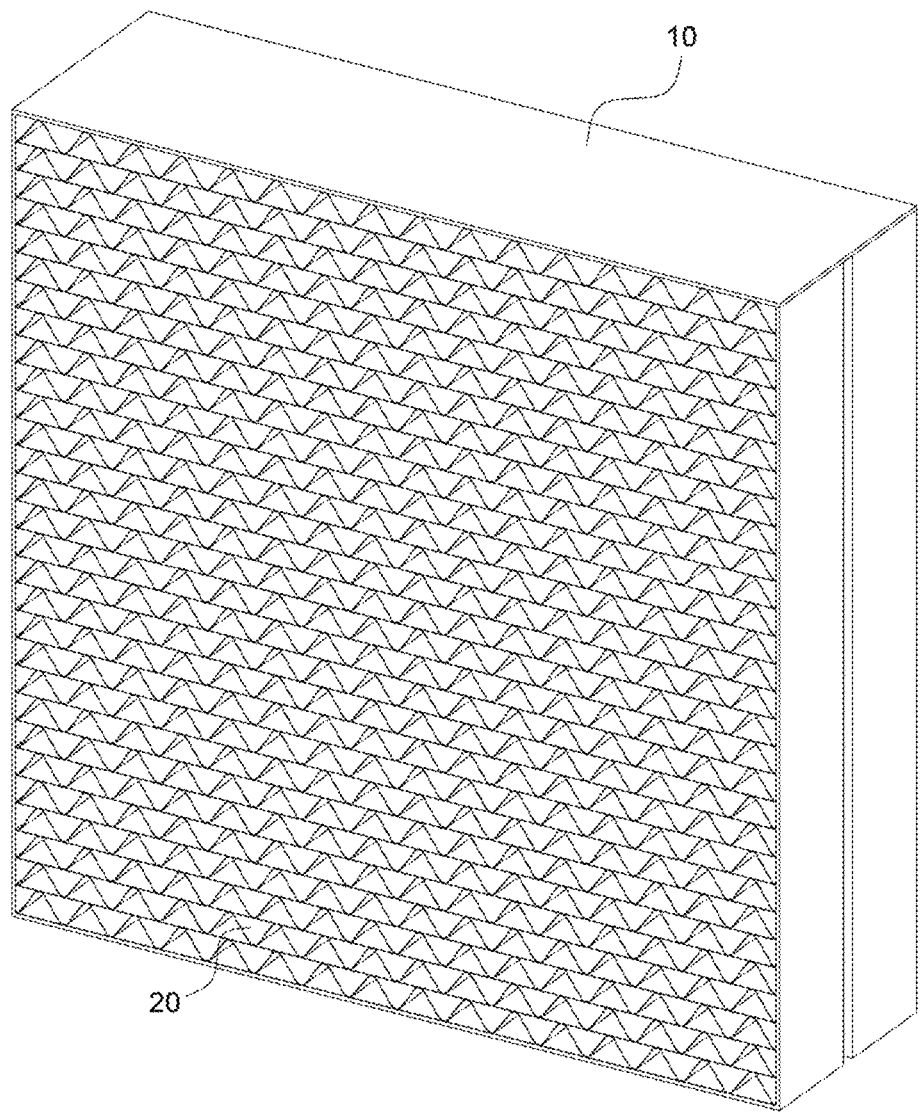
FIG. 23 is a view showing a catalytic reaction apparatus according to a second embodiment of the present invention.

FIG. 23 is a view showing a catalytic reaction apparatus according to a second embodiment of the present invention.

The catalytic reaction apparatus according to the present invention includes a body portion 10 and a catalyst portion 20.

The body portion 10 has a configuration in which the catalyst portion 20 is coupled to fix the catalyst portion 20. The body portion 10 is provided with a plate material bent so that the body portion 10 has a circular, oval or polygonal frame shape. It is natural that a person skilled in the art to which the present invention pertains can easily change the shape of the body portion 10 according to the implementation environment of the catalytic reaction apparatus. Hereinafter, in the present description, a catalytic reaction apparatus including a square body portion 10 will be described as a reference. In detail, the body portion 10 according to the present invention may include a body 11 and a cover 12.

The main body 11 is configured to provide a space for the catalyst portion 20 to be stacked. In detail, the main body 11 is provided in a " ㄷ " shape by bending the plate material to form side walls 111 at both ends. Accordingly, the catalyst portion 20 may be stacked along both side walls 111 from the bottom surface of the main body 11.

The cover 12 is configured to fix the catalyst portion 20 by being coupled to the upper end of the main body 11. In detail, the cover 12 is provided in the shape of a plate so that both side ends are coupled to the upper end of the side wall 111, respectively, thereby limiting the space inside the main body 11. That is, the catalyst portion 20 is stacked and fixed inside the body portion 10 having a square structure formed by the main body 11 and the cover 12.

The catalyst portion 20 is formed inside the body portion 10 and is configured to be in contact with a fluid. In detail, the catalyst portion 20 is stacked on the inside of the body portion 10 and has a cross-section provided in a mesh shape so that the fluid passes therethrough. Preferably, the catalyst portion 20 is provided with a width equal to the inner width of the body portion 10, and may be provided so as to fill the space inside the body portion 10 without leaving any space by being stacked from the bottom surface of the inner body portion 10 to the position of the cover 12.

The body portion 10 and the catalyst portion 20 may be made of a material containing a catalyst for reacting with a fluid, or a catalyst may be coated on the surface. Since the cross-section of the catalyst portion 20 is provided in a mesh shape, the contact area with the fluid is maximized to improve the reaction rate.

In addition, a guide portion 112 may be included to guide the stacking of the catalyst portion 20. In detail, at least one guide portion 112 is formed in the body portion 10 along the stacking direction of the catalyst portion 20 to guide the stacking of the catalyst portion 20.

According to the 2-1 embodiment of the present invention, the guide portion 112 is formed on the side wall 111 inside the main body 11, and the first guide 112*a* may be provided so as to protrude by a predetermined height in the inner direction of the side wall 111 along the stacking direction of catalyst portion 20.

Such a guide portion 112 is provided to guide the stacking of the catalyst portion 20, thereby facilitating the manufacture of the catalytic reaction apparatus, and has an effect of preventing the catalyst portion 20 from being separated from the completed catalytic reaction apparatus.

Preferably, the catalyst portion 20 may be provided with a groove portion 201 corresponding to the guide portion 112. According to the 2-1 embodiment, since the guide portion 112 protrudes from the inner side wall 111 of the body portion 10 by a predetermined height, it is preferable that the groove portion 201 is provided by being engraved at least as much as the predetermined height at which the guide portion 112 protrudes.

Figure 24:
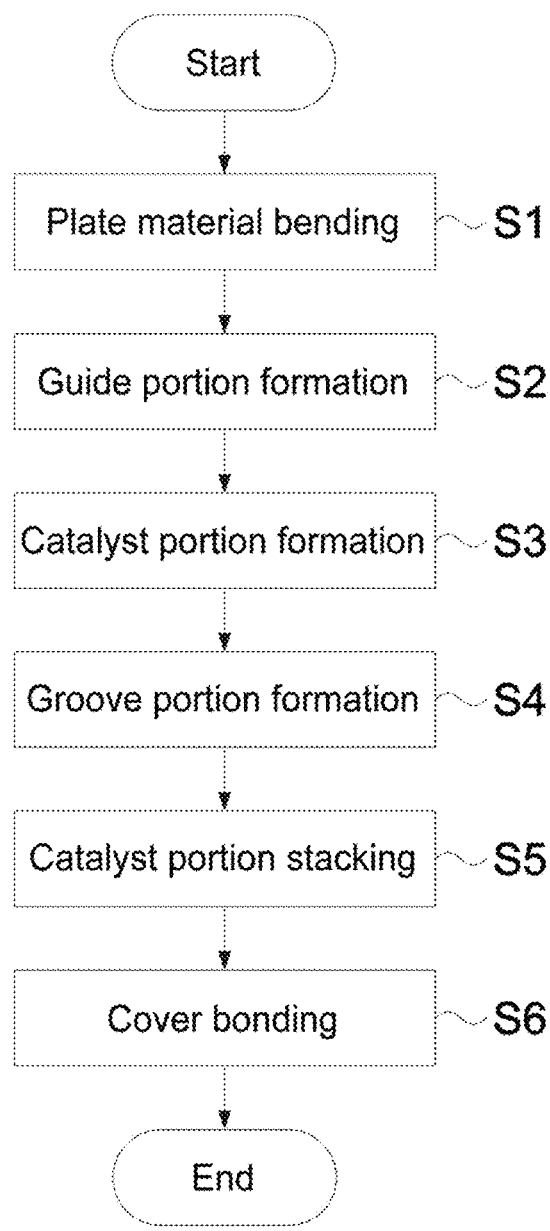
FIG. 24 is a flowchart showing a method of manufacturing a catalytic reaction apparatus according to a second embodiment of the present invention.

The method for manufacturing such a catalytic reaction apparatus includes a bending step (S1), a guide portion-forming step (S2), a catalyst portion-forming step (S3), a groove portion-forming step (S4), a stacking step (S5) and a cover bonding step (S6) (see FIG. 24).

Figure 25:
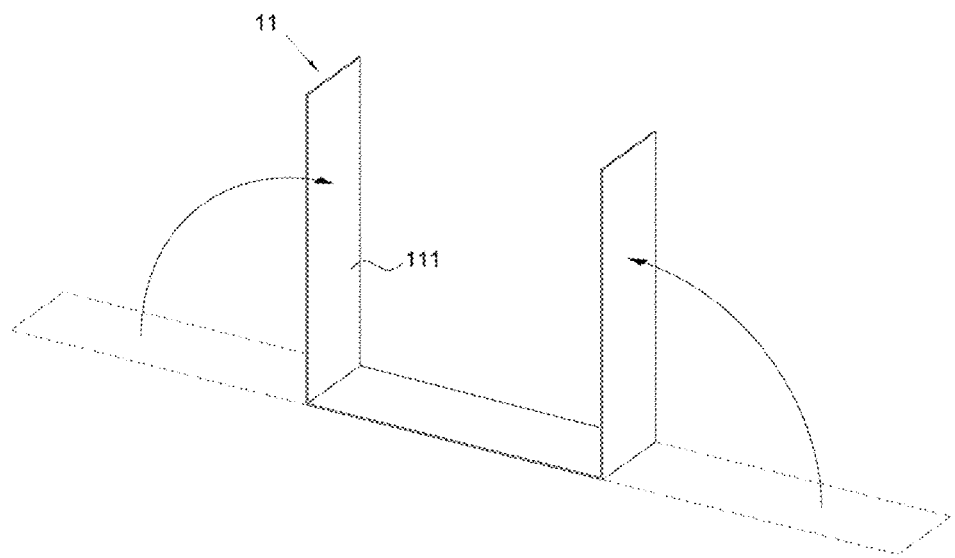
FIG. 25 is a view showing a bending step (S1) according to the second embodiment of the present invention.

The bending step S1 is a step of forming the main body 11 having a space for stacking the catalyst portion 20 by bending the plate material. To this end, in the bending step (S1), the plate material is divided into three and bent so that both directions are orthogonal to the middle portion to form the side wall 111, so that the main body 11 is formed in a " ㄷ " shape (see FIG. 25).

The guide portion-forming step (S2) is a step performed after the bending step (S1), and is provided to form a guide portion 112 for guiding and fixing the stacking of the catalyst portion 20. To this end, the guide portion 112 is formed by processing the side wall 111 formed in the main body 11 through a separate processing means.

Figure 26:
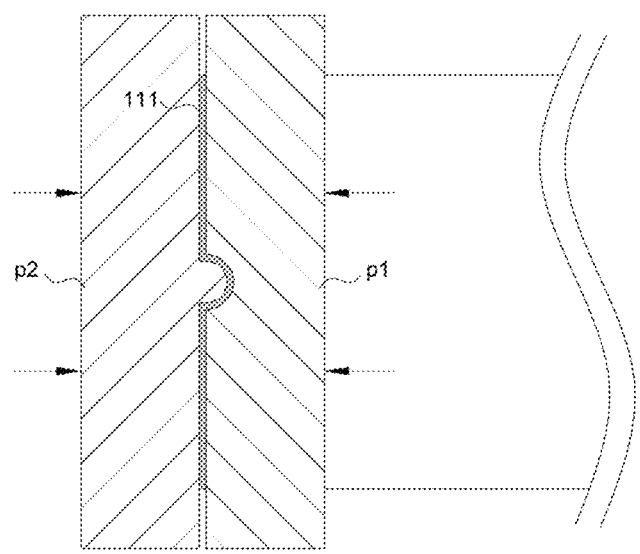
FIG. 26 is a view showing a guide portion-forming step according to a 2-1 embodiment of the present invention.
Figure 27:
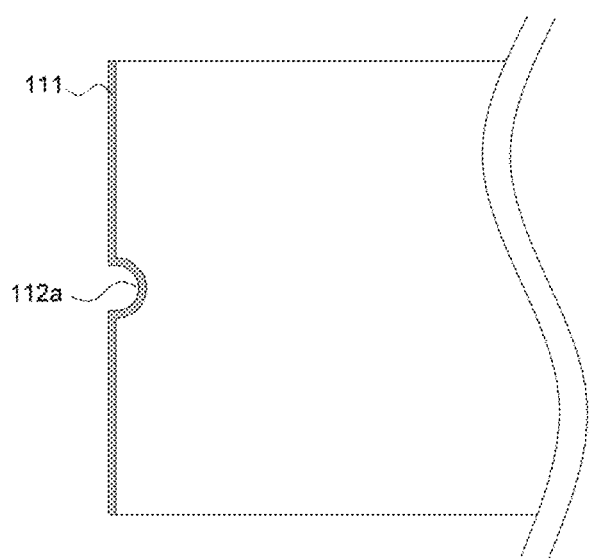
FIG. 27 is a view showing a side wall and a guide portion according to the 2-1 embodiment of the present invention.
Figure 28:
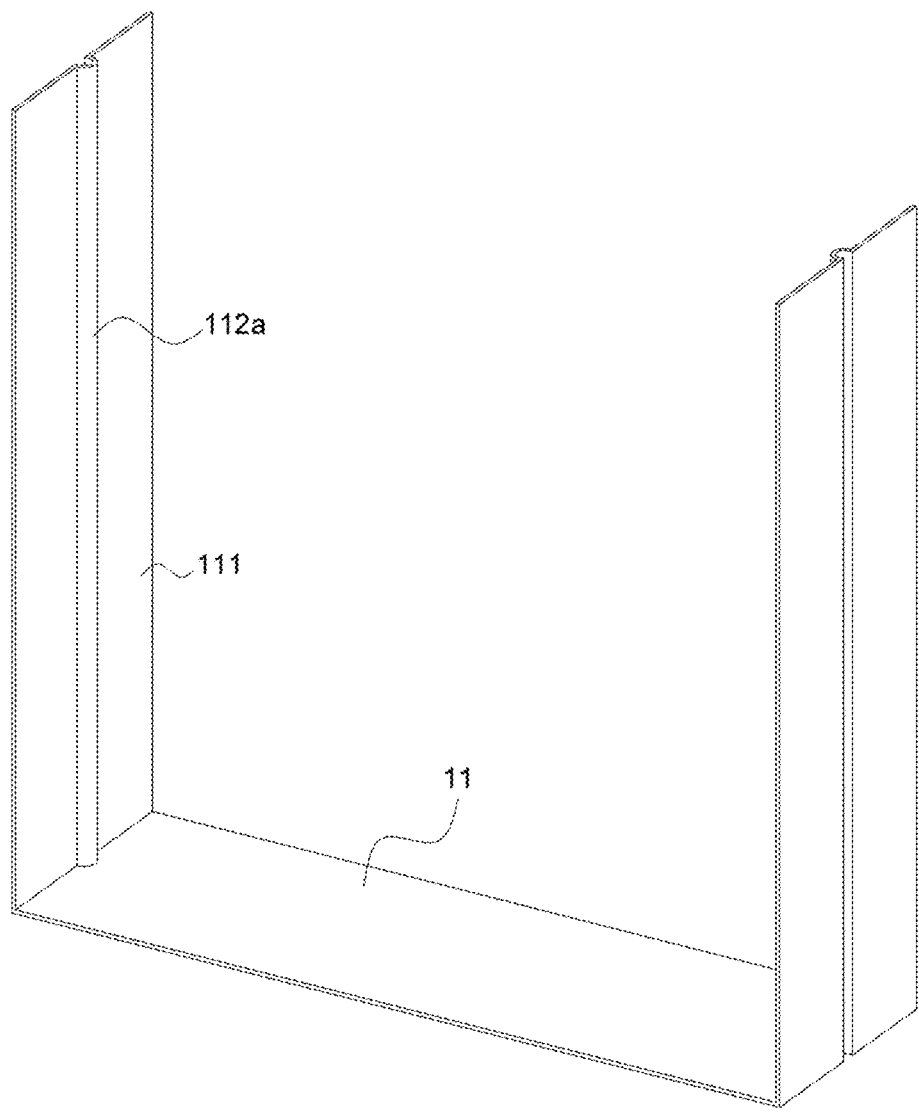
FIG. 28 is a view showing a main body according to a 2-1 embodiment of the present invention.

FIG. 26 is a view showing the guide portion-forming step (S2) according to the 2-1 embodiment of the present invention. FIG. 26 is a view based on the one side wall 111 of the main body 11 viewed from the upper side. According to one embodiment of the present invention, the guide portion 112 may be formed by pressing the side wall 111. In detail, a first press p1 engraved on the inner surface of the side wall 111 as much as a height at which the guide portion 112 protrudes is contacted to support the side walls 111, on the outer surface of the side wall 111, a second press p2 projecting so that one side corresponds to the shape in which the first press p1 is engraved and the thickness of the side wall 111 presses the side wall 111. That is, the guide portion 112 is formed by pressing a portion of the side wall 111 to protrude inward (see FIGS. 27 and 28).

Figure 29:
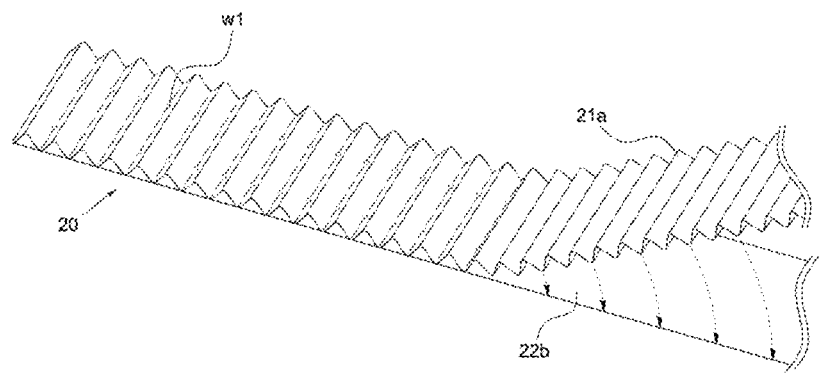
FIG. 29 is a view showing a first catalyst portion and a second catalyst portion according to the second embodiment of the present invention.

The catalyst portion-forming step (S3) is a step of forming the catalyst portion 20 to be stacked inside the body portion 10. Referring to FIG. 29, in order to manufacture the catalyst portion 20 having a mesh cross-section, the catalyst portion 20 may be provided by combining the first catalyst portion 21a and the second catalyst portion 22a.

In detail, the catalyst portion-forming step S3 may include a catalyst portion bonding step S311 for bonding a first catalyst portion 21a having a wavy or zigzag shape in a cross-section and a second catalyst portion 22a having the plate shape to form the catalyst portion 20 and a step S312 for cutting the catalyst portion 20 to fit the size of the inside of the body portion 10.

The first catalyst portion 21a is configured so that the cross-section of the catalyst portion 20 can be provided in a mesh shape. According to one embodiment of the present invention, the first catalyst portion 21a is provided as a plate having a predetermined thickness having a wavy or zig-zag cross-section. Such a first catalyst portion 21a may be manufactured through press processing.

The second catalyst portion 22a is configured to support the first catalyst portion 21a. In detail, the second catalyst portion 22a is provided in the form of a flat plate and is coupled to the first catalyst portion 21a. In detail, each end of the wave or zigzag shape of the first catalyst portion 21a is joined to one surface of the second catalyst portion 22a (step S311).

Figure 30:
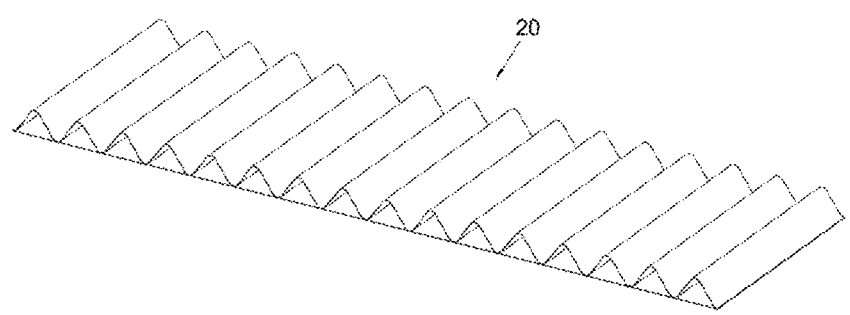
FIG. 30 is a view showing a second catalyst portion according to a second embodiment of the present invention.

After the first catalyst portion 21a and the second catalyst portion 22a are joined, the catalyst portion 20 is manufactured by cutting to fit the size of the inside of the body portion 10 (step S312, see FIG. 30).

As a preferred embodiment, in the catalyst portion-bonding step, the first catalyst portion 21a and the second catalyst portion 22a may be bonded (w1) to a predetermined position in advance among the surfaces in contact with each other by a spot welding technique. In the catalytic reaction apparatus according to the present invention, since a catalyst portion 20 having the same shape is stacked inside the body portion 10, the catalyst portion 20 before cutting is manufactured in the form of a belt having no length limitation, so that each catalyst portion 20 may be manufactured to be cut to a predetermined length (see FIGS. 29 and 30). Therefore, the catalyst portion 20 before cutting can be continuously produced through a means such as a conveyor, and it becomes possible to quickly produce a large amount of the catalyst portion 20 by the spot welding technique and cutting. That is, mass production of the catalytic reaction apparatus is facilitated and production costs are reduced.

Figure 31:
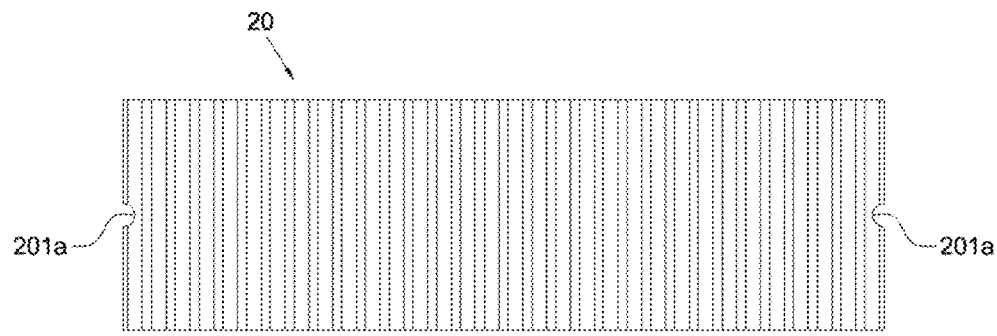
FIG. 31 is a view showing the catalyst portion and the first groove according to the 2-1 embodiment of the present invention.

The groove portion-forming step S4 is a step performed after the catalyst portion 20 manufacturing step, and is a step of forming the groove portion 201 corresponding to the guide portion 112 formed through the guide portion-forming step S2 described above. Since the first guide 112a according to the 2-1 embodiment of the present invention is formed on the side wall 111 inside the main body 11, the groove portion 201 may be a first groove 201a formed by projecting both side ends of the catalyst portion 20 so as to correspond thereto. FIG. 31 shows the catalyst portion 20 according to the 2-1 embodiment of the present invention as viewed from above. As shown in FIG. 31, the first groove portion 201a according to the 2-1 embodiment of the present invention is formed in an engraved shape in which both side ends of the catalyst portion 20 correspond to the shape in which the first guide 112a protrudes.

Figure 32:
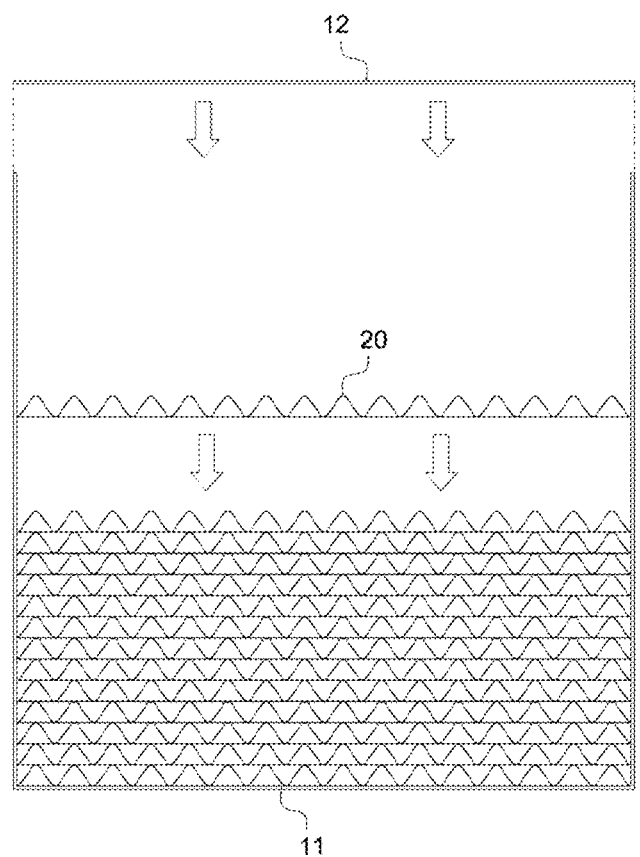
FIG. 32 is a view showing a stacking step (S5) and a cover bonding step according to a second embodiment of the present invention.

FIG. 32 is a view showing the stacking step (S5) and the cover bonding step (S6) according to the 2-1 embodiment of the present invention.

The stacking step (S5) is a step of disposing the catalyst portion 20 in the inner direction of the body portion 10. In detail, by inserting the guide portion 112 formed on the main body 11 formed in a " ⊏ " shape and the groove portion 201 formed in the catalyst portion 20 so as to be in contact with each other, the catalyst portions 20 are sequentially inserted into the body portion 10 and stacked.

Figure 33:
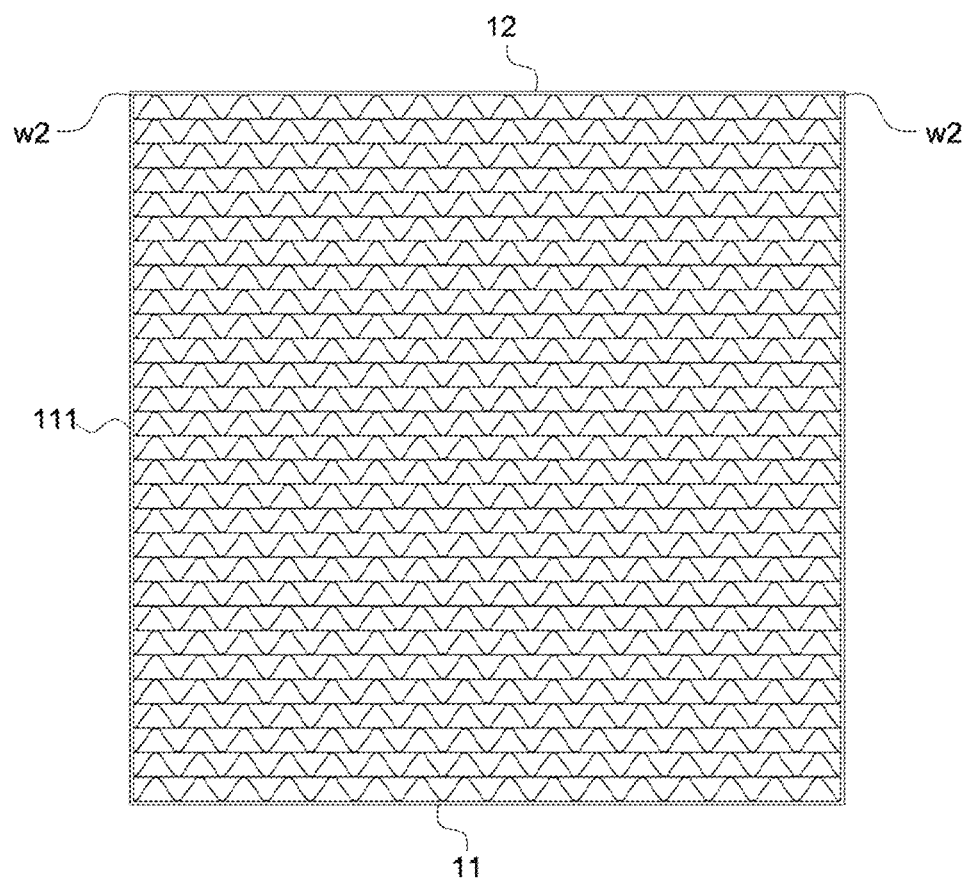
FIG. 33 is a view showing a catalytic reaction apparatus according to a second embodiment of the present invention.

The cover bonding step (S6) is a step performed after the stacking step (S5), and after the plurality of catalyst portions 20 are inserted into the inner direction of the body portion 10, it is separately provided to join (w2) a cover 12 having a " — " or " ⌐ " shaped cross-sectional shape to each upper end of the side wall 111 (refer to FIG. 33).

Figure 34:
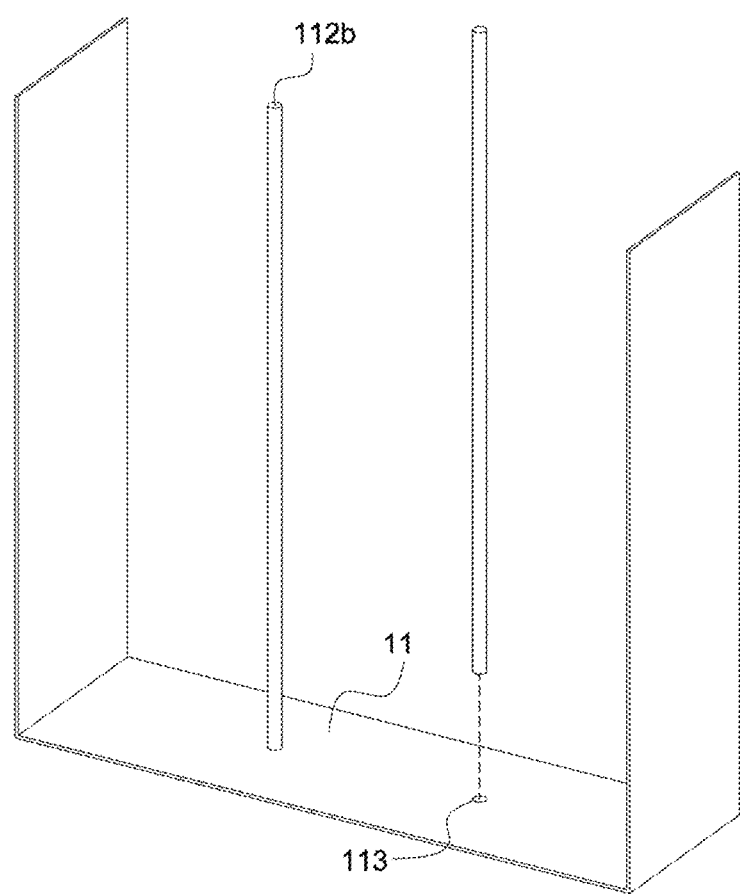
FIG. 34 is a view showing a guide portion-forming step according to a 2-2 embodiment of the present invention.

FIG. 34 is a view showing the guide portion-forming step according to the 2-2 embodiment of the present invention.

As the 2-2 embodiment of the present invention, the guide portion 112 is a column-shaped second guide 112b connected from the bottom surface of the main body 11 to the cover 12 in the stacking direction of the catalyst portion 20. Similarly, the groove portion 201 may be a second groove portion 201b formed by being perforated to correspond thereto. In the present description, the second guide 112b is illustrated with reference to a column shape having a circular cross-section.

Meanwhile, preferably, a first perforated portion 113 may be provided on the bottom surface of the main body 11 so that the second guide 112b can be formed in the bottom surface of the main body 11. In detail, a first perforated portion 113 is provided in the bottom surface of the main body 11 in a shape consistent with the cross-sectional shape of the second guide 112b, and the second guide 112b is inserted and joined to the first perforated portion 113.

Since the first perforated portion 113 is provided, the position at which the second guide 112b is joined to the main body 11 can be precisely adjusted so that it is possible to prevent problems occurring in lamination. In addition, since the second guide 112b can be joined to the main body 11 from the outside of the main body 11 by providing the first perforated portion 113, the interference of the side wall 111 with the tool or operator of the joining work is prevented.

Figure 35:
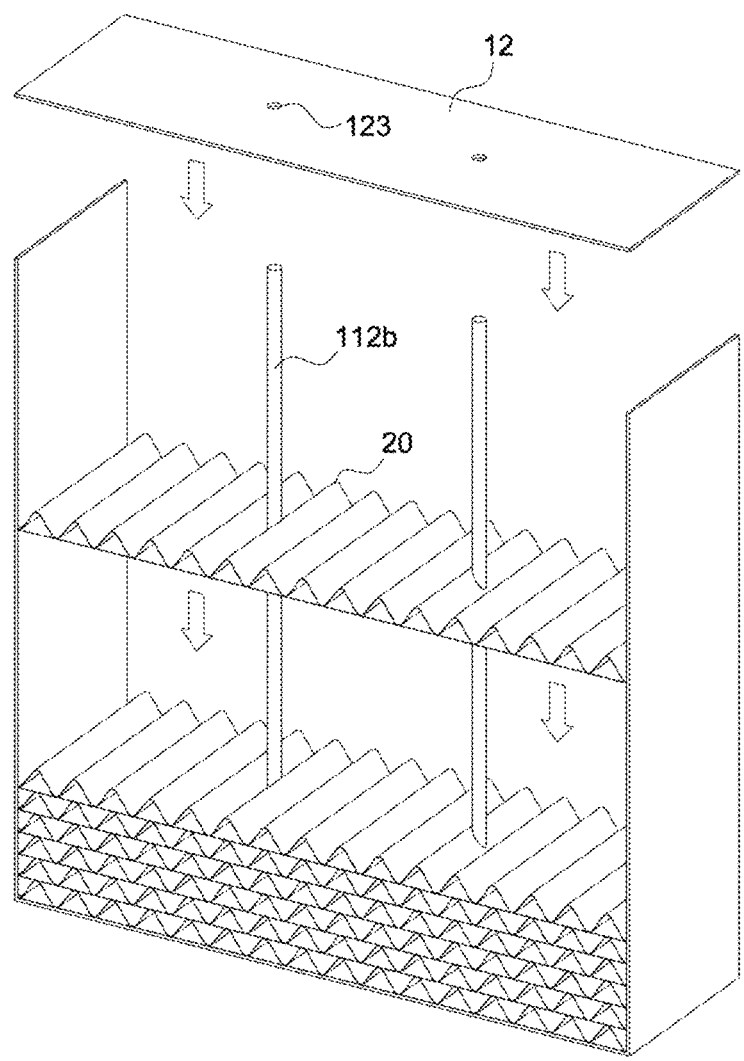
FIG. 35 is a view showing a stacking step (S5) and a cover bonding step according to the 2-2 embodiment of the present invention.

FIG. 35 is a view showing the lamination step (S5) and the cover coupling step (S6) according to the 2-2 embodiment of the present invention.

As shown in FIG. 35, according to the 2-2 embodiment of the present invention, unlike the first groove portion 201a formed in the side end of the catalyst portion 20, it can be seen that the second groove portion 201b passes through the catalyst portion 20 vertically.

Figure 36:
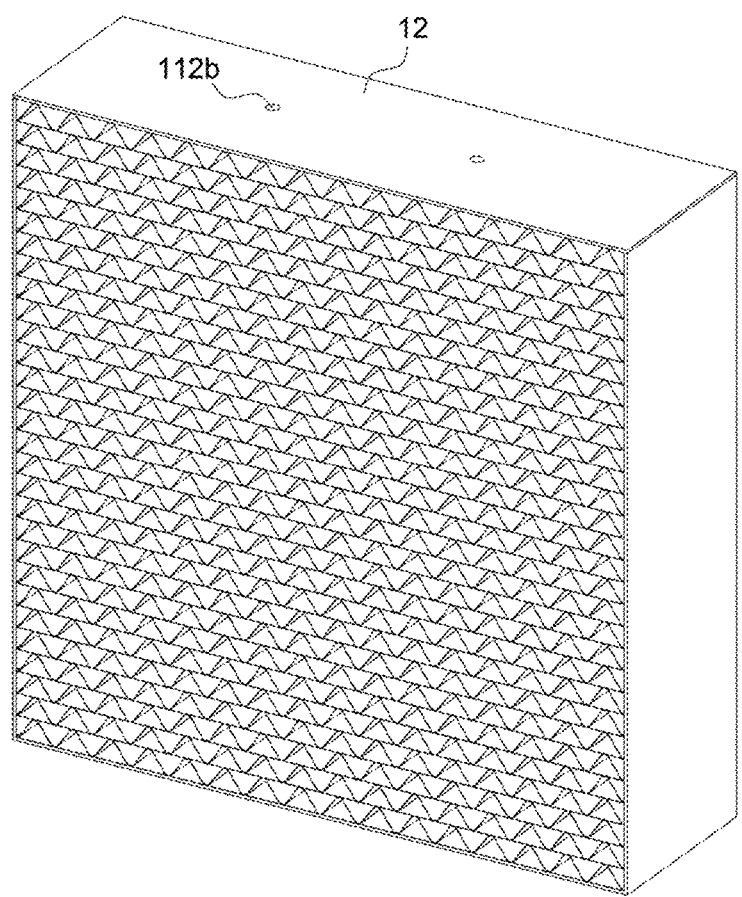
FIG. 36 is a view showing a catalytic reaction apparatus according to a 2-2 embodiment of the present invention.

In addition, the cover 12 may be provided with a second perforated portion 123. In detail, the cover 12 is provided with a second perforated portion 123 in a shape consistent with the cross-sectional shape of the second guide 112b, and the second guide 112b, at the same time that the cover 12 is coupled to the side wall 111, is inserted into the second perforated portion (123). Since the second perforated portion 123 is provided, the position at which the second guide 112b is joined to the main body 11 can be precisely adjusted so that it is possible to prevent problems occurring in lamination. In addition, since the second guide 112b can be joined to the cover 12 from the outside of the main body 11 by providing the second perforated portion 123, the interference of the catalyst portion 20 and the side wall 111 with the tool or operator of the joining work is prevented (see FIG. 36).

The guide portion 112 according to the 2-1 and 2-2 embodiments may have a cross-section of any one of a circle, a semi-circle, an ellipse, a semi-ellipse, a polygon, and a semi-polygon, and those skilled in the art can easily change it in the present invention.

Figure 37A:
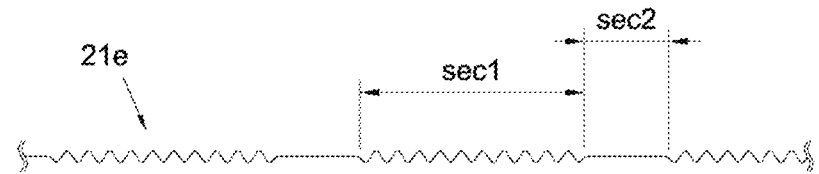
FIGS. 37A-37B are views showing a second substrate according to yet another embodiment of the present invention.
Figure 37B:
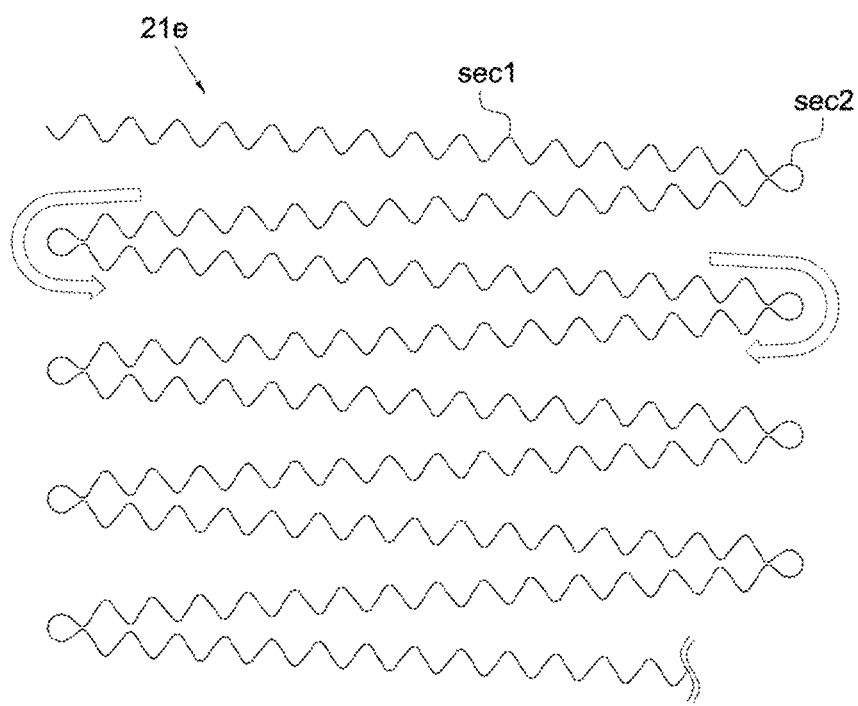
Figure 38:
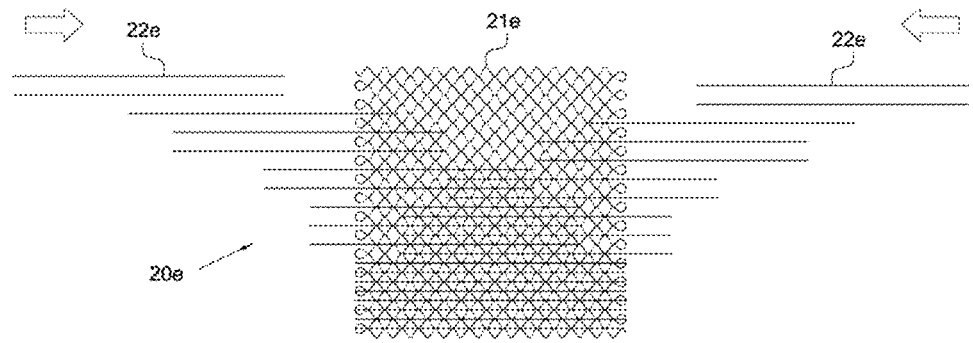
FIG. 38 is a view showing a step of forming a catalyst portion according to another embodiment of the present invention.
Figure 39:
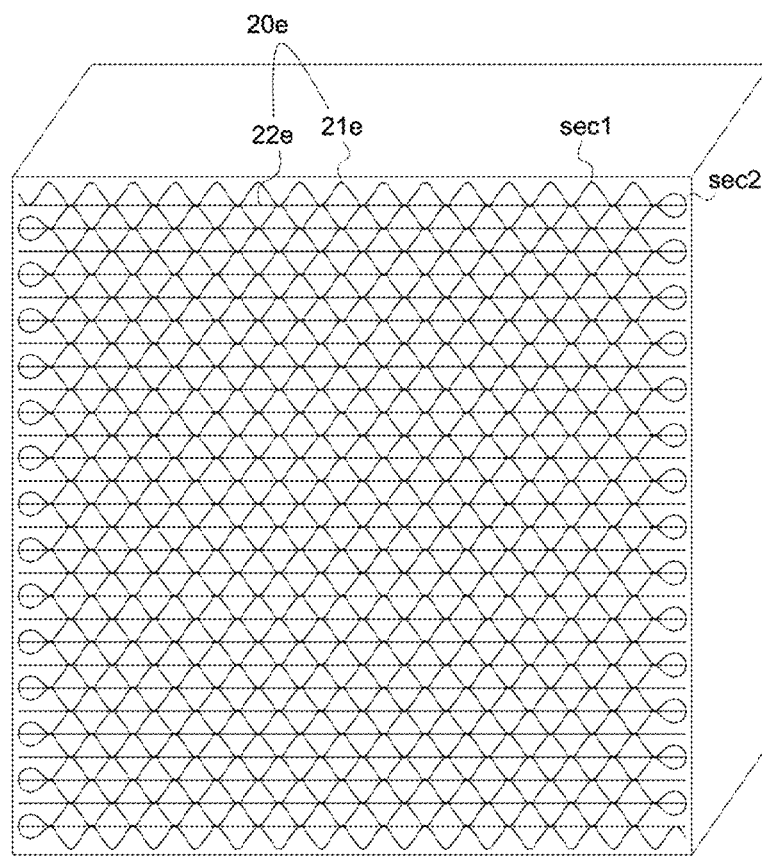
FIG. 39 is a view showing a catalytic reaction apparatus according to another embodiment of the present invention.

As yet another embodiment of the present invention, the catalyst portion may be a catalyst portion 20e including a first catalyst portion 21e and a second catalyst portion 22e. Referring to FIGS. 37A-37B, the first catalyst portion 21e includes a repeating arrangement of a first section sec1 having a wavy or zig-zag cross-section and a second section sec2 having a one-shaped (" — ") cross-section, and this repeating arrangement is provided so that each of the repeated second sections sec2 is bent to form a zigzag shape so that the first section sec1 is positioned on the same line. Referring to FIG. 38, the second catalyst portions 22e are respectively inserted between mutually contacting first sections sec1 of the first catalyst portion 21e. FIG. 39 shows an embodiment including the first catalyst portion 21e and the second catalyst portion 22e of the present invention.

To this end, the catalyst portion-forming step S3 may include forming a first catalyst portion 21e in which a first section sec1 having a wave or zigzag shape in a cross-section and a second section sec2 having a one-shaped (" — ") cross-section are repeatedly arranged, bending the second section sec2 of the first catalyst portion 21e to form a zigzag shape; and inserting plate-shaped second catalyst portion 22e between mutually contacting first sections sec1 of the first catalyst portion 21e.

As another embodiment of the present invention, instead of stacking a plurality of catalyst portions, a winding step in which a single catalyst portion 20f is wound and inserted into the body portion 10 may be included.

Figure 40:
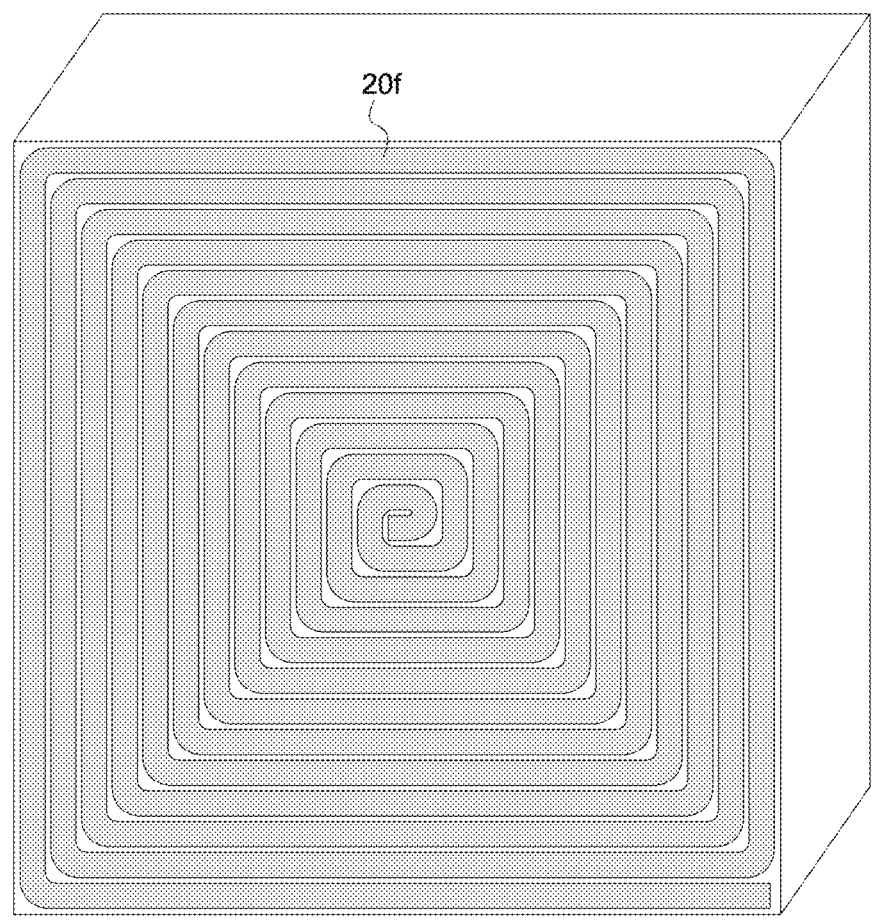
FIG. 40 is a view showing a catalytic reaction apparatus according to another embodiment of the present invention.

The winding step is a step that can be performed instead of the step (S312) of cutting the above-described catalyst portion to fit the size of the inside of the frame, and a pre-cut catalyst portion in the form of a belt is wound to conform to the shape of the space inside the body portion 10 (See FIG. 40). In the present description, although it is illustrated based on the winding according to the shape of the square body portion 10, those skilled in the art can easily change the winding shape to correspond to other embodiments of the body portion 10.

Third Embodiment

Before describing the third embodiment of the present invention in detail, "the upper end of the first catalyst portion" means a peak portion of the first catalyst portion having a wavy cross-sectional shape, and "the lower end of the first catalyst portion" means a valley portion of the first catalyst portion.

In addition, the "peak portion" described in the present invention means a portion protruding outward from the surface when the configuration according to the present invention is initiated, and the "valley portion" means a portion formed inwardly concave by being formed to appear engraved from the surface compared to the "peak portion". That is, as will be described later, the first catalyst portion 21 is provided to have a wavy shape in which the peak U and the valley D are formed along the second direction d2, so that when viewed from the first direction d1, the first catalyst portion 21 has a wavy cross-section.

In addition, the "support" is configured to provide a space in which the catalytic reaction of the fluid is performed, and a plurality of catalyst portions can be accommodated in a stacked state in the vertical direction, and for this, the support may be provided so that one side in the first direction is open. However, the shape of the support is not limited to various shapes such as an open upper surface and various accommodation methods of the catalyst portion may be used.

Figure 41:
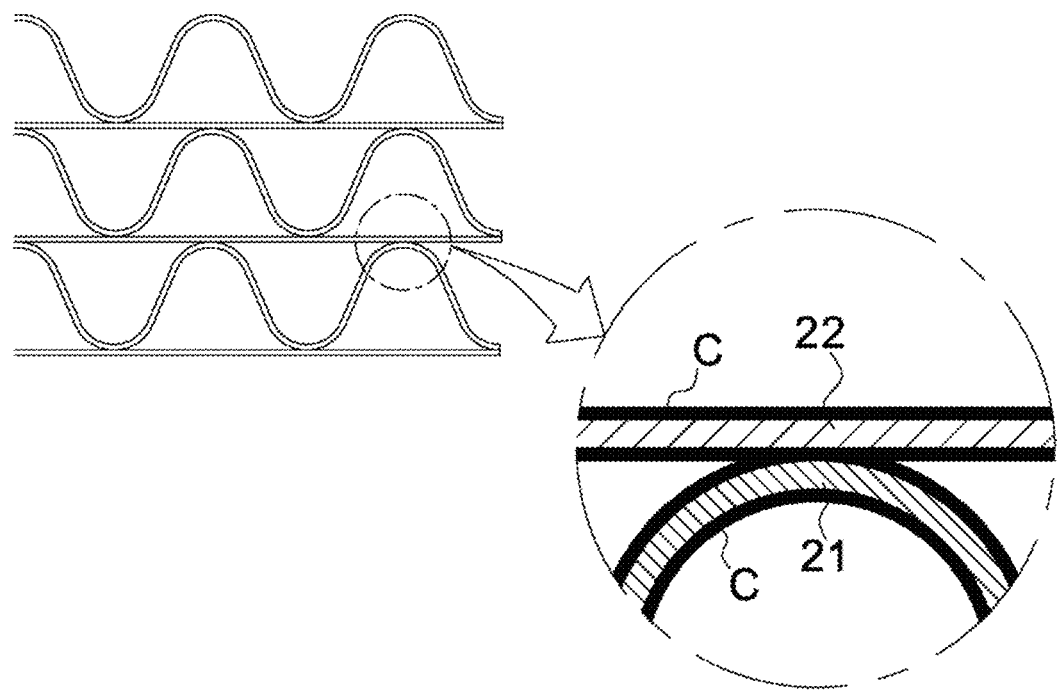
FIG. 41 is an enlarged cross-sectional view showing a coating composition for a catalyst and a catalyst portion according to an embodiment of the present invention.

FIG. 41 is an enlarged cross-sectional view showing the coating composition for a catalyst according to an embodiment of the present invention. The coating composition for a catalyst according to the present invention is coated on the surfaces of the first catalyst portion 21 and the second catalyst portion to be described later (see reference number "c" in FIG. 41). In detail, the coating composition for a catalyst is applied to the first catalyst portion 21 and the second catalyst portion 22 prepared with iron and chromium, and further includes titanium and at least one selected from tungsten and vanadium. Accordingly, the first catalyst portion 21 and the second catalyst portion 22 including the coating composition for the catalyst are made of iron, chromium, tungsten, vanadium and titanium. In detail, vanadium more easily removes nitrogen oxides in a low temperature environment of less than 300° C., and tungsten can more easily remove nitrogen oxides in a high temperature environment of 300° C. or more. In addition, since the first catalyst portion and the second catalyst portion according to the present invention are prepared with iron and chromium, it has the effect of maximizing durability compared to a conventional catalyst. In the case of titanium constituting the first catalyst portion 21 and the second catalyst portion 22, the surface area for reaction with nitrogen oxide is increased and the coating composition including vanadium and tungsten serves to prevent unintended removal. Additionally, since iron and chromium have high thermal reaction rates, nitrogen oxides can be removed more quickly when a high-temperature fluid is supplied, thereby maximizing the removal efficiency of nitrogen oxides compared at the same time. By applying the coating composition for a catalyst as described above, the first catalyst portion 21 and the second catalyst portion 22 according to the present invention are not limited to low temperatures and high temperatures, and can achieve rapid catalytic reaction and strong support, and thus may have significant catalytic reaction effects and safety over conventional catalysts.

Embodiment

The first catalyst portion 21 and the second catalyst portion 22 according to the present invention may be formed by coating the surfaces with a plurality of compositions. In detail, the surfaces of the first catalyst portion 21 and the second catalyst portion may be provided to be coated with a mixture of tungsten, vanadium and titanium, and more detailed parts by weight of the coating composition are shown in Table 1 below.

TABLE 1

| Composition | W | V | Ti | O |
|---|---|---|---|---|
| Parts by weight | 1~15 | 1~15 | 35~55 | 30~45 |

The coating composition coated on the first catalyst portion 21 and the second catalyst portion 22 is prepared with 1 to 15 parts by weight of tungsten, 1 to 15 parts by weight of vanadium, 35 to 55 parts by weight of titanium, and 30 to 45 parts by weight of oxygen. In addition, since the first catalyst portion 21 and the second catalyst portion 22 to which the coating composition is applied as described above are made of metal materials such as iron and chromium, it is possible to be stacked and mounted into a more robust support than conventional catalysts. Here, tungsten, vanadium, and titanium are materials that cause a catalytic reaction in contact with a fluid, and since the activation energy of the fluid is lowered, an easier catalytic reaction can be induced. In addition, as the above-described titanium, tungsten, and vanadium are provided in the form of oxides in the coating composition, oxygen is included in a large amount. In addition, since the first catalyst portion 21 and the second catalyst portion 22 composed of the above-described coating composition and iron and chromium do not discolor during the catalytic reaction with the fluid, and oxygen is contained to be strong against corrosion, the replacement cycle of the first and second catalyst portion 21 and 22 increases, thereby maximizing the ultimate catalytic reaction efficiency. As a more preferred embodiment, the coating composition may include at least two or more of carbon (C), silicon (Si), iron (Fe), aluminum (Al), and niobium (Nb).

Through the above embodiment, it is possible to induce a more active catalytic reaction of the first catalyst portion 21 and the second catalyst portion 22 used at less than 300° C. In detail, in a catalytic reaction environment of less than 300° C., since the catalytic activity of vanadium is high, the parts by weight of vanadium is greater than the parts by weight of tungsten. As described above, in the first catalyst portion 21 and the second catalyst portion 22 of the present invention, a composition having a higher reactivity corresponding to the temperature at which the catalytic reaction is performed has a relatively large composition ratio, so when compared with a general catalyst, it can have greater catalytic conversion efficiency.

As a more preferred embodiment of the present invention, the first catalyst portion 21 and the second catalyst portion 22 to which the coating composition according to the present invention is applied may further contain cobalt. In detail, the coating composition may further include 0.1 to 5 parts by weight of cobalt. This maximizes the corrosion resistance and strength of the first catalyst portion 21 and the second catalyst portion 22, thereby making the replacement cycle of the first catalyst portion 21 and the second catalyst portion 22 longer, and ultimately it can lead to maximization of catalytic reaction efficiency.

Additionally, the coating method according to the present invention is to coat the first catalyst portion 21 and the second catalyst portion 22 with the above-described coating composition, wherein the coating composition includes at least one selected from tungsten and vanadium, tungsten is included in an amount of 1 to 15 parts by weight, and vanadium is included in an amount of 1 to 15 parts by weight.

Experiment 1

Experiment 1 is an experiment to measure the change in catalytic reaction efficiency that occurs as the catalytic reaction environment changes. To this end, an experiment was conducted in a high temperature environment of 200° C. to 450° C. or higher, and the results of measuring the conversion rate are shown in Table 2 below.

TABLE 2

| Tem- | Composition | | | Conversion |
|---|---|---|---|---|
| perature | W | V | Ti | rate |
| 200 | 5 | 8 | 40 | 67 |
| 250 | 5 | 8 | 40 | 84 |
| 300 | 5 | 8 | 40 | 90 |
| 350 | 5 | 8 | 40 | 95 |
| 400 | 5 | 8 | 40 | 92 |
| 450 | 5 | 8 | 40 | 56 |

Through Experiment 1, it was found that the conversion rate increased as the temperature increased at less than 350° C., but the catalyst efficiency gradually decreased as the temperature increased in an environment of 350° C. or more. That is, it can be seen that the conversion rate at 350° C. is the largest.

Figure 51:
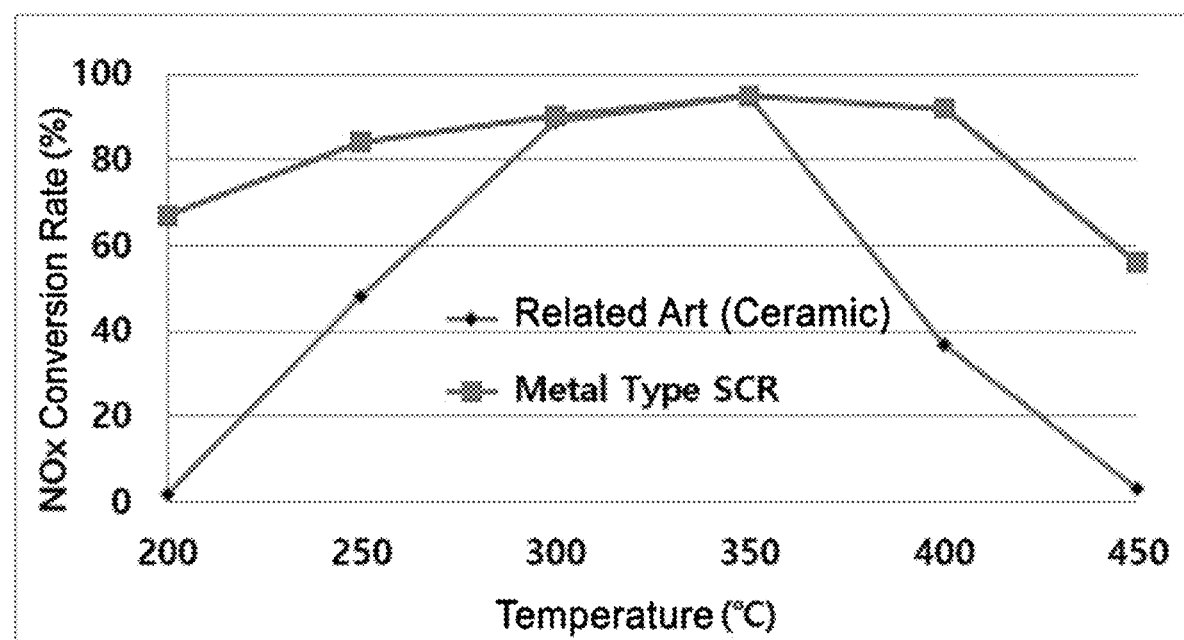
FIG. 51 is a view comparing nitrogen oxide conversion rates for the catalyst portion according to an embodiment of the present invention and a conventional catalyst.

Additionally, the catalytic conversion efficiency by the coating composition according to the present invention can be altered by the temperature of the fluid (exhaust gas) passing through the first catalyst portion 21 and the second catalyst portion 22 to which the coating composition of the same composition is applied. In detail, referring to FIG. 51, the catalyst according to the present invention is a metal type, and has a significant difference in catalytic conversion efficiency in the low-temperature and high-temperature sections as compared to the conventional ceramic type. In detail, the catalyst according to the present invention does not drastically reduce the conversion rate at which nitrogen oxides are converted into nitrogen or the like in a low-temperature environment of less than 350° C. and a high-temperature atmosphere of 350° C. or higher. On the other hand, in the case of the conventional ceramic-type catalyst, it can be seen that the conversion rate at less than 300° C. decreases as the temperature decreases, and the conversion rate decreases sharply again in an environment of 350° C. or higher. Through this, it can be seen that the metal-type catalyst according to the present invention has a relatively uniform conversion rate in different temperature environments compared to the conventional ceramic-type catalyst.

Figure 42:
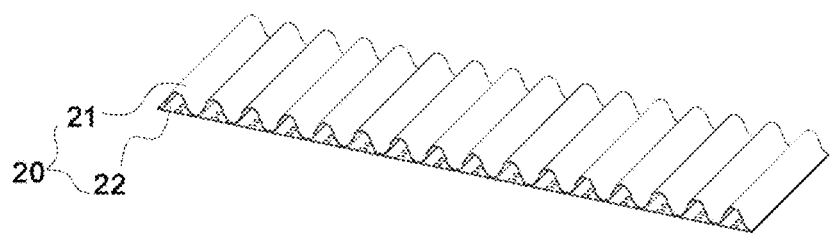
FIG. 42 is a perspective view showing the entire catalytic reaction apparatus according to a third embodiment of the present invention.

FIG. 42 is a perspective view showing the entire catalytic reaction apparatus according to the third embodiment of the present invention. The catalytic reaction apparatus according to the present invention includes a catalyst portion 20 accommodated in a support to carry out a catalytic reaction with a fluid, and the catalyst portion 20 includes a first catalyst portion 21 and a second catalyst portion 22. FIG. 42 is a view showing the catalyst portion 20 in which the first catalyst portion 21 and the second catalyst portion 22 are integrally provided, and a first catalyst portion 21 having a cross-sectional shape such as a wave, or the like based on a second direction d2, and a plate-shaped second catalyst portion 22 positioned below the first catalyst portion 21. In addition, as one or more catalyst portions 20 are supplied with a fluid in a state in which they are stacked in the vertical direction on the above-mentioned support, the catalyst portion 20 comes into contact with the fluid inside the support and performs a catalytic reaction.

Figure 43:
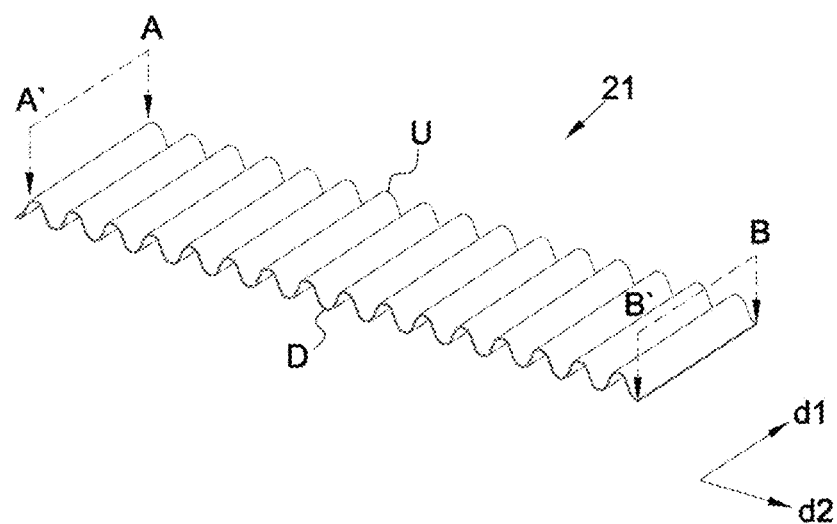
FIG. 43 is a perspective view showing a first catalyst portion according to the third embodiment of the present invention.

FIG. 43 is a perspective view showing the first catalyst portion 21 according to the third embodiment of the present invention.

The first catalyst portion 21 is configured to maximize the catalytic reaction with the fluid. The first catalyst portion 21 is provided to have a wavy cross-sectional shape when viewed from the first direction d1. In more detail, the first catalyst portion 21 is formed to have a wavy shape along the second direction d2. In addition, in order to have the cross-sectional shape as described above, the first catalyst portion 21 is formed by processing through a separate pressing means provided with a roller, a press, or the like. Since the first catalyst portion 21 is provided as described above, the contact area with the fluid can be significantly increased compared to the conventional catalyst provided in the form of a flat plate, thereby maximizing catalytic reaction efficiency.

Meanwhile, since the concave-convex pattern 210 is arranged on the first catalyst portion 21, it is possible to increase the fastening force with the second catalyst portion 22 to be described later, thereby maximizing the rigidity in the support body.

Figure 44:
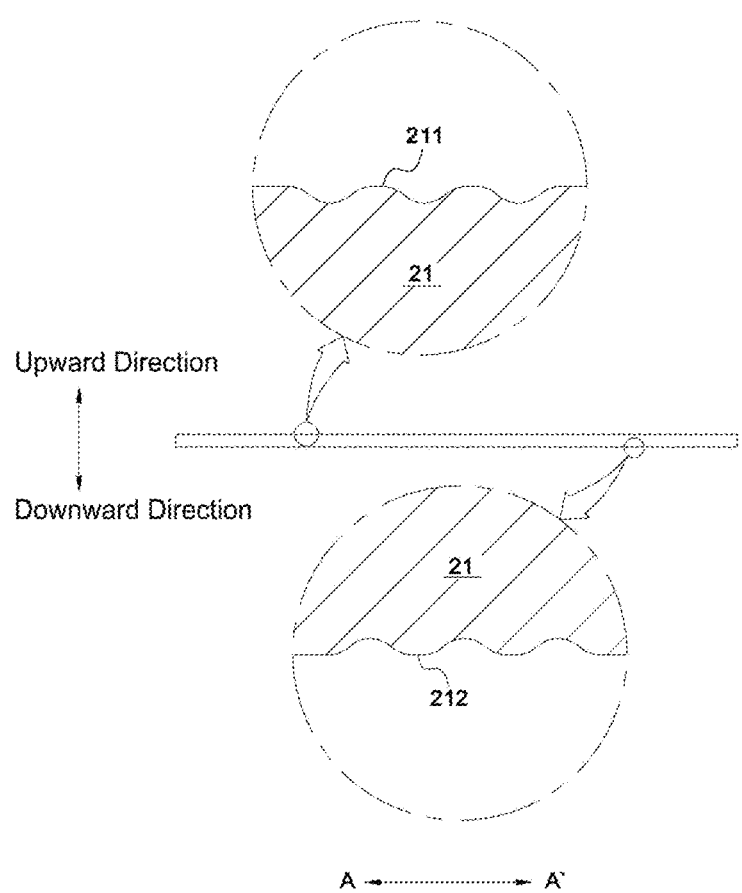
FIG. 44 is an enlarged cross-sectional view showing a first concave-convex pattern portion 111 and a second concave-convex pattern portion 112 according to the third embodiment of the present invention.

FIG. 44 is an enlarged cross-sectional view (a cross-sectional view taken along line A-A' in FIG. 3) showing the first concave-convex pattern portion 211 and the second concave-convex pattern portion 212, each of the first concave-convex pattern portion 211 and the second concave-convex pattern portion 212 is enlarged and illustrated as a cross-sectional view when viewed in the second direction d2 as a reference.

The concave-convex pattern 210 is arranged on the surface of the first catalyst portion 21. In detail, the concave-convex pattern 210 is arranged in the first catalyst portion 21 along the first direction d1 provided vertically while being horizontal to the second direction d2. In more detail, the concave-convex pattern 210 includes a first concave-convex pattern portion 211 and a second concave-convex pattern portion 212.

The first concave-convex pattern portion 211 is provided to increase the fastening force through contact with the second catalyst portion 22. To this end, the first concave-convex pattern portion 211 is provided on the upper end of the first catalyst portion 21. In detail, the first concave-convex pattern portion 211 is formed on the peak portion of the first catalyst portion 21, and the plurality of first concave-convex pattern portions 211 are formed along the first direction d1. Accordingly, the upper end of the first catalyst portion 21 has a shape in which fine valleys are formed. In detail, the first concave-convex pattern portion 211 has a fine valley shape with respect to the second direction d2. That is, the first concave-convex pattern portion 211 having a "〰〰" cross-section is formed on the peak U of the first catalyst portion 21.

Here, the first concave-convex pattern portion 211 is formed through a manufacturing method of pressing the first catalyst portion 21 from an upward direction to a downward direction through a pressing means such as a separate press. Accordingly, a first convex portion 2111 and a first concave portion 2112 formed by pressing are provided on the upper surface of the first concave-convex pattern portion 211, and the lower surface is provided with a second concave portion 2114 and a second convex portion 2113 corresponding to the first convex portion 2111 and the first concave portion 2112. A more detailed description thereof will be provided later with reference to FIG. 45.

The second concave-convex pattern portion 212 is provided for the same purpose as the first concave-convex pattern portion 211. To this end, the second concave-convex pattern portion 212 has the same shape as the first concave-convex pattern portion 211, and is positioned in the valley D of the first catalyst portion 21 and is formed along the valley D. In detail, the second concave-convex pattern portion 212 is manufactured through a process in which the above-described separate pressing means presses the valley D of the first catalyst portion 21 from the downward direction to the upward direction. In this process, a third convex portion 2121 and a third concave portion 2122 are formed, and a more detailed description thereof will be described later with reference to FIG. 45.

The first concave-convex pattern portion 211 and the second concave-convex pattern portion 212 as described above can be formed by a manufacturing method in which after processing the first catalyst portion 21 into the wavy cross-sectional shape described above, it is press-bonded by a pressing means such as a separate press to form fine valleys. Meanwhile, the first catalyst portions 21 including the first concave-convex pattern portion 211 and the second concave-convex pattern portion 212 interact with each other through contact with the second catalyst portion 22 to be described later in FIG. 8 and can significantly increase fastening and catalytic conversion efficiency.

Figure 45A:
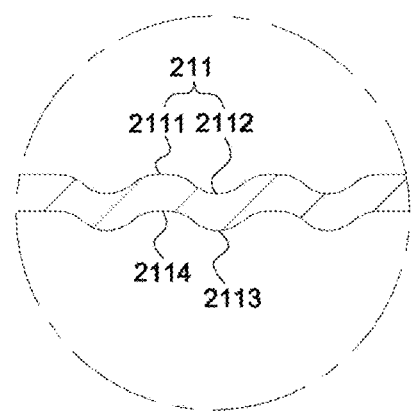
FIG. 45 is a view showing respective configurations of the first concave-convex pattern portion 111 and the second concave-convex pattern portion 112 according to the third embodiment of the present invention.
Figure 45B:
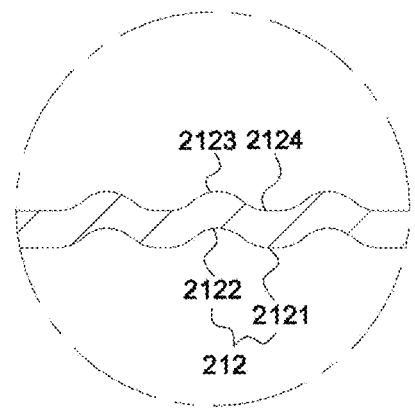

FIG. 45 is a view showing each configuration of the first concave-convex pattern portion 211 and the second concave-convex pattern portion 212 according to the third embodiment of the present invention, and FIG. 45A is based on the A-A' cross-section of FIG. 43, and FIG. 45B is based up the B-B' cross-section in FIG. 43.

As described above, by forming the first concave-convex pattern portion 211, the first convex portion and the first concave portion are formed on the upper surface of the peak U (see FIG. 45A). In addition, due to an external force acting during pressure formation, the second concave portion 2114 and the second convex portion 2113 are formed on the lower surface of the peak U corresponding to the first convex portion 2111 and the first concave portion 2112. That is, the first convex portion 2111 and the second concave portion 2114 correspond to each other, and the first concave portion 2112 and the second convex portion 2113 are provided to correspond to each other.

As the second concave-convex pattern portion 212 is formed, a third convex portion 2121 and a third concave portion 2122 are formed on the lower surface of the valley D (see FIG. 45B). In addition, a fourth concave portion 2124 and a fourth convex portion 2123 are formed on the upper surface of the valley D to correspond to the third convex portion 2121 and the third concave portion 2122. That is, the third convex portion 2121 and the fourth concave portion 2124 correspond to each other, and the valley D of the first catalyst portion 21 is pressed from the lower side to the upper side so that the third concave portion 2122 and the fourth convex portion 2123 correspond to each other Since the first concave-convex pattern portion 211 and the second concave-convex pattern portion 212 as described above are provided, the fluid passing between the first catalyst portion 21 and the second catalyst portion 22 can increase the area in contact with the first catalyst portion 21 and the retention time, thereby maximizing the ultimate catalytic reaction efficiency.

Figure 46:
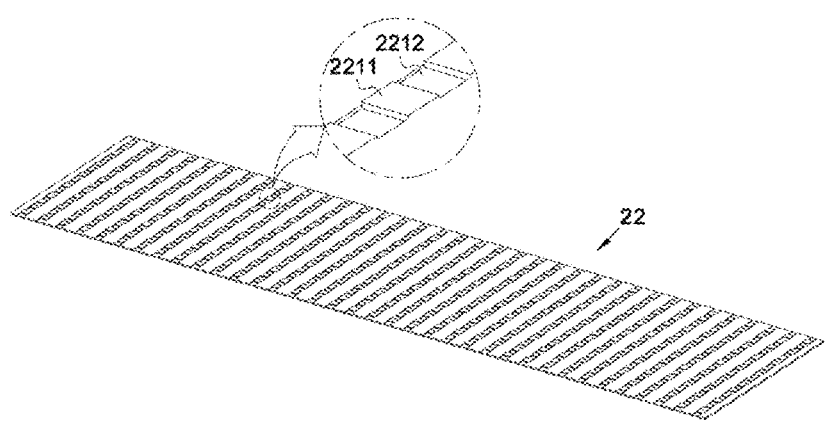
FIG. 46 is a view showing a second catalyst portion according to a third embodiment of the present invention.

FIG. 46 is a view showing a second catalyst portion according to a third embodiment of the present invention.

The second catalyst portion 22 is configured to carry out a catalytic reaction with a fluid in the same manner as the first catalyst portion 21. To this end, the second catalyst portion 22 is provided in the form of a plate and is positioned below the first catalyst portion 21. In addition, the second catalyst portion 22 includes a first punching pattern and a second punching pattern for preventing separation from the inside of the support through interactions with the above-described the first concave-convex pattern portion 211 and the second concave-convex pattern portion 212, and the first punching pattern and the second punching pattern are manufactured through a manufacturing method of pressing the second catalyst portion in the vertical direction with a separate punching means.

Figure 47:
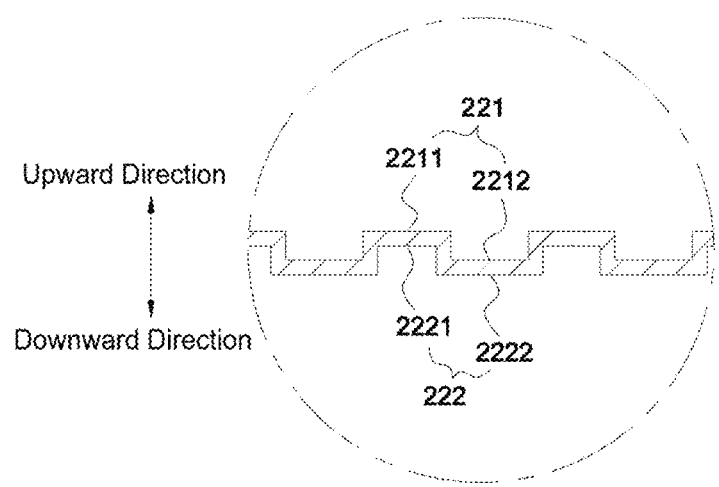
FIG. 47 is a cross-sectional view of a second catalyst portion according to a third embodiment of the present invention.

FIG. 47 is a cross-sectional view of a second catalyst portion according to a third embodiment of the present invention.

A first punching pattern 221 is formed on an upper surface of the second catalyst portion 22 and a second punching pattern 222 is formed on a lower surface thereof, and the first punching pattern 221 includes a first embossed portion 2211 and a first engraved portion 2212, and the second punching pattern includes a second embossed portion 2221 and a second engraved portion 2222.

The first embossed portion 2211 and the second embossed portion 2221 respectively protrude from the upper and lower surfaces of the second catalyst portion 22, and are provided in plurality to have a predetermined lattice arrangement. Here, the shape of the first embossed portion 2211 and the second embossed portion 2221 may be processed to be a square columnar shape or a protruding portion becomes a round type, and the shape is not limited thereto.

The first engraved portion 2212 and the second engraved portion 2222 are intaglio-formed from the upper and lower surfaces of the second catalyst portion 22, are provided in plurality to have a lattice arrangement. In detail, the first engraved portion 2212 is positioned between the plurality of first embossed portions 2211, and the second engraved portion 2222 is provided between the plurality of second embossed portions 2221.

Through the manufacturing method of pressing the second catalyst portion 22 from the upward direction to the downward direction or from the downward direction to the upward direction, the first embossed portion 2211 and the first engraved portion 2212 are formed on the upper surface of the second catalyst portion, and the second engraved portion 2222 and the second embossed portion 2221 corresponding thereto are formed on the lower surface. That is, the second engraved portion 2222 is provided below the first embossed portion 2211, and the second embossed portion 2221 is provided below the first engraved portion 2212, based on the cross-sectional view of FIG. 47.

The first punching pattern and the second punching pattern as described above may be in contact with the first catalyst portion of the first catalyst portion 21 positioned above the second catalyst portion 22 or the first catalyst portion 21' of another catalyst portion 20' positioned in the downward direction, which has the effect of increasing the binding force between the first catalyst portion 21 and the second catalyst portion 22.

Meanwhile, the second catalyst portion 22 is manufactured in a flat plate shape through a punching and pressing process, and the catalyst portion 20 is integrally manufactured by being integrally provided through seam welding while in contact with the first catalyst portion 21 after the formation of a fine valley.

Figure 48:
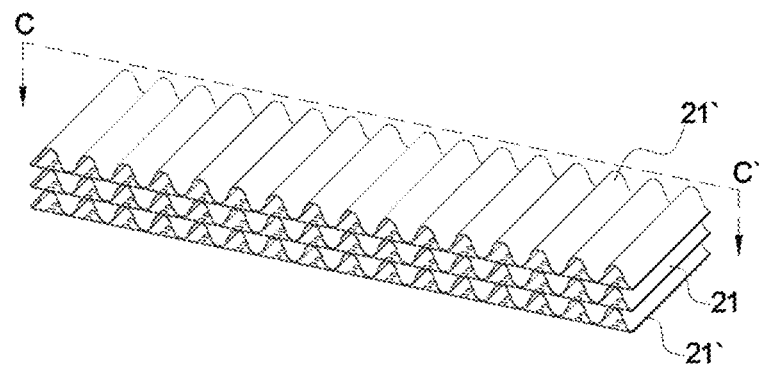
FIG. 48 is a view showing that a plurality of catalyst portions are stacked in the vertical direction according to the third embodiment of the present invention.

FIG. 48 is a view showing that a plurality of catalyst portions 20 are stacked in the vertical direction according to the third embodiment of the present invention. In order to avoid confusion with the "catalyst portion 20" described in FIGS. 42 to 47, "another catalyst portion 20'" described in FIGS. 48 to 50 will be described with different reference numerals. As described above, the catalyst portion 20 may be housed in a support so that another catalyst portion 20' is stacked sequentially and overlaps in the vertical direction while the first catalyst portion 21 and the second catalyst portion 22 are integrally provided. In the process of contacting the catalyst portion 20 and another catalyst portion 20', the first concave-convex pattern portion 211 and the second concave-convex pattern portion 212 come into contact with the first punching pattern and the second punching pattern and a frictional force increases, and as a result, it is possible to induce an increase in the ultimate binding force.

Figure 49:
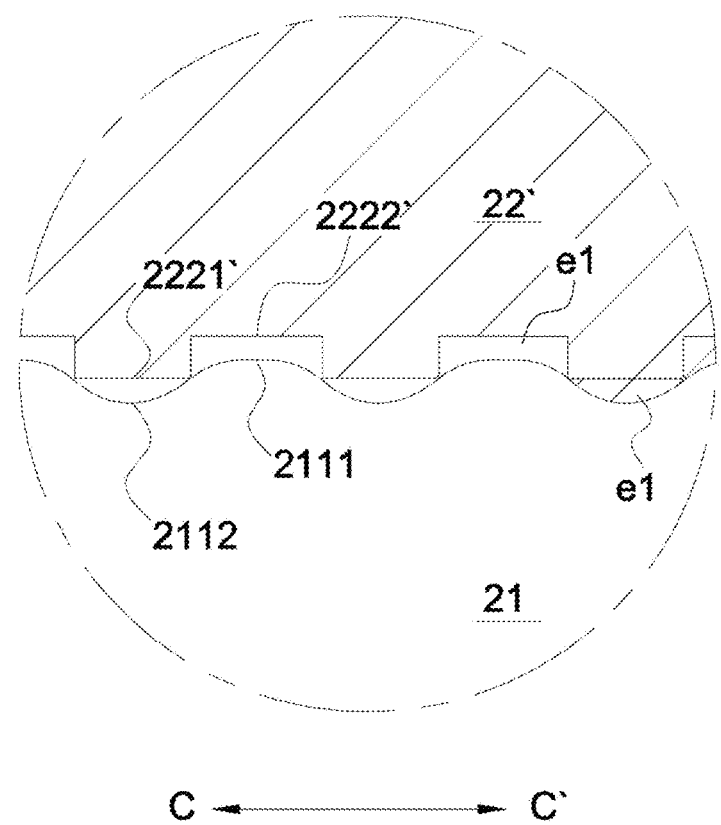
FIG. 49 is a view showing that the first catalyst portion and another second catalyst portion positioned in the upward direction are bound to each other according to the third embodiment of the present invention.

FIG. 49 is a view showing that the first catalyst portion 21 and another second catalyst portion 22' positioned in the upward direction are bound to each other according to the third embodiment of the present invention, and shows the contact of the catalyst portion 20 and another catalyst portion 20' positioned in the upward direction, and FIGS. 49 and 50 will be described based on the cross-section C-C' of FIG. 48.

As the first concave-convex pattern portion 211 is provided, another second catalyst portion 22' is positioned above the first catalyst portion 21 in which the first convex portion 2111 and the first concave portion 2112 are formed. In this process, the first concave-convex pattern portion 211 is in contact with another second punching pattern 222' formed on the lower surface of another second catalyst portion 22'. In detail, the first convex portion 2111 is in contact with another second engraved portion 2222', and at the same time, the first concave portion 2112 is in contact with another second embossed portion 2221'.

That is, as the first concave-convex pattern portion 211 is in contact with another second punching pattern 222' positioned in the upward direction, the first convex portion 2111, the first concave portion 2112, another second embossed portion 2221', and another second engraved portion 2222' are positioned to engage, line contact, or point contact each other. In this process, the frictional force between the first catalyst portion 21 and another second catalyst portion 22' positioned in the upward direction is significantly increased, which has the effect of preventing the separation of the first catalyst portion 21 and another second catalyst portion 22' by an external force.

Additionally, the first convex portion 2111, the first concave portion 2112, another second engraved portion 2222' and another second embossed portion 2221' do not completely contact each other, so that the first space portion e1 is formed. It absorbs shocks that may be generated by external forces in the vertical direction. At the same time, the fluid that may be lost among the plurality of catalyst portion 20 is prevented from pooling at a specific position. Accordingly, by preventing the coating layer that may be formed on the surfaces of the first catalyst portion 21 and another second catalyst portion 22' from being peeled off more quickly, as the shortening of the replacement cycle is prevented, the ultimate catalytic conversion efficiency can be maximized.

Figure 50:
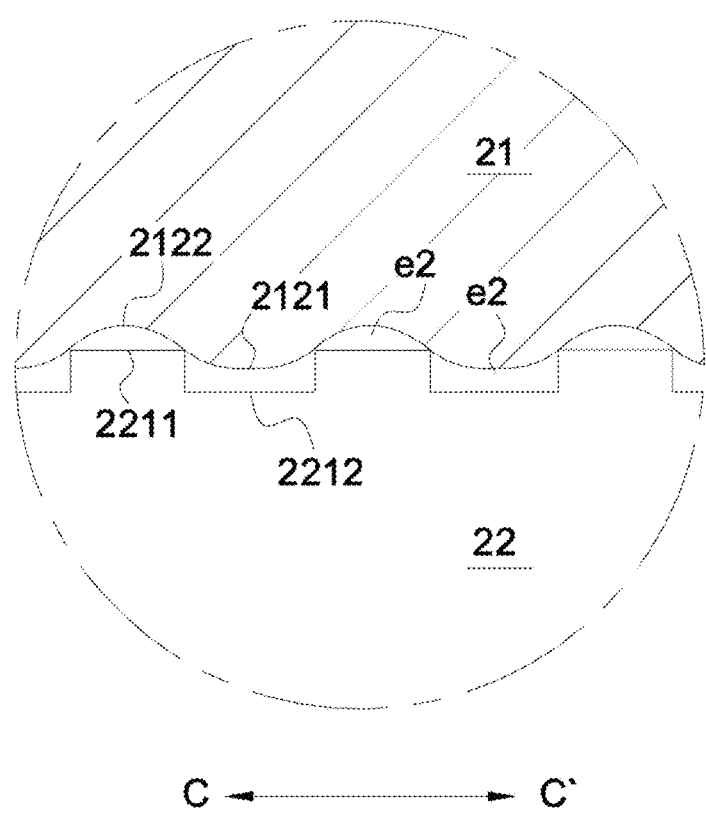
FIG. 50 is a view showing that the first catalyst portion and the second catalyst portion are bound to each other according to the third embodiment of the present invention.

FIG. 50 is a view illustrating that the first catalyst portion 21 and the second catalyst portion 22 are bound to each other according to the third embodiment of the present invention, and is a diagram showing the increase in binding force according to the contact between the first catalyst portion 21 and the second catalyst portion 22.

When the second concave-convex pattern portion 212 and the second punching pattern 222 come into contact with each other, the frictional force between the first catalyst portion 21 and the second catalyst portion 22 constituting one catalyst portion 20 is increased. In detail, the third convex portion 2121 positioned at the lower end of the first catalyst portion 21 and facing downward is in contact with the first engraved portion 2212 protruding upward as the first punching pattern 221 is provided. In addition, the third concave portion 2122 is in contact with the first embossed portion 2211. That is, as the third convex portion 2121 and the first engraved portion 2212 are engaged with each other, and the third concave portion 2122 and the first embossed portion 2211 are disposed to engage with each other, the first catalyst portion 21 and the effect of increasing the frictional force between the first catalyst portion 21 and the second catalyst portion 22 may be derived.

Additionally, since there is no complete surface contact between the third convex portion 2121 and the first engraved portion 2212 and between the third concave portion 2122 and the first embossed portion 2211, the second space e2 is formed therebetween. By forming the second space portion e2 as described above, an external force in the vertical direction or the first direction d1 can be buffered, and excessive displacement fluctuations of the first catalyst portion 21 and the second catalyst portion 22 and damage can be prevented in advance.

Although the present invention has been described with reference to a preferred embodiment, this is only an embodiment, and a person skilled in the art may be able to make various modifications and equivalent other embodiments therefrom. Accordingly, the scope of the present invention is not limited by the above embodiments and the accompanying drawings.

INDUSTRIAL APPLICABILITY

According to the present invention, it is possible to prevent a decrease in catalytic reaction efficiency in a specific temperature environment, thereby maximizing versatility.

The invention claimed is:

1. A catalytic reaction apparatus, the apparatus comprising a plurality of catalyst portions to which a coating composition is applied,
   wherein the coating composition comprises 1 to 15 parts by weight of tungsten, 1 to 15 parts by weight of vanadium, 35 to 55 parts by weight of titanium and 30 to 45 parts by weight of oxygen,
   wherein each of the plurality of catalyst portions includes a first catalyst portion and a second catalyst portion positioned below the first catalyst portion,
   wherein the second catalyst portion has a shape of a plate,
   wherein the first catalyst portion has a corrugated shape in a cross-section thereof,
   wherein an upper end of the first catalyst portion has a shape in which valleys are formed, and
   wherein each of the plurality of catalyst portions is stacked on one another in a vertical direction.

2. The catalytic reaction apparatus of claim 1, wherein the coating composition further comprises at least one of carbon, silicon, iron, aluminum, or niobium.

3. A method of coating a catalytic apparatus including a plurality of catalyst portions, the method comprising:
   applying a coating composition to the plurality of catalyst portions,
   wherein the coating composition comprises 1 to 15 parts by weight of tungsten, and 1 to 15 parts by weight of vanadium, 35 to 55 parts by weight of titanium and 30 to 45 parts by weight of oxygen,
   wherein each of the plurality of catalyst portions includes a first catalyst portion and a second catalyst portion positioned below the first catalyst portion,
   wherein the second catalyst portion has a shape of a plate,
   wherein the first catalyst portion has a corrugated shape in a cross-section thereof,
   wherein an upper end of the first catalyst portion has a shape in which valleys are formed, and
   wherein each of the plurality of catalyst portions is stacked on one another in a vertical direction.

4. The method of claim 3,
   wherein the coating composition further comprises at least one of carbon, silicon, iron, aluminum, or niobium.

* * * * *